United States Patent
Miyata et al.

(10) Patent No.: US 10,131,307 B2
(45) Date of Patent: Nov. 20, 2018

(54) ACTIVATION CONTROL DEVICE FOR OCCUPANT PROTECTION DEVICE

(71) Applicant: TOYOTA JIDOSHA KABUSHIKI KAISHA, Toyota-shi, Aichi (JP)

(72) Inventors: Yujiro Miyata, Kasugai (JP); Hisashi Hagiwara, Toyota (JP); Masamitsu Okazaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 111 days.

(21) Appl. No.: 15/424,111

(22) Filed: Feb. 3, 2017

(65) Prior Publication Data

US 2017/0232919 A1    Aug. 17, 2017

(30) Foreign Application Priority Data

Feb. 15, 2016   (JP) ................... 2016-025461

(51) Int. Cl.
  *B60R 21/01*       (2006.01)
  *B60R 21/0136*     (2006.01)
  *B60R 21/0132*     (2006.01)

(52) U.S. Cl.
  CPC ...... *B60R 21/0136* (2013.01); *B60R 21/0132* (2013.01); *B60R 2021/0102* (2013.01);
  (Continued)

(58) Field of Classification Search
  CPC ............ B60R 21/0136; B60R 21/0132; B60R 2021/01272; B60R 2021/0102; B60R 2021/01211
  See application file for complete search history.

(56) References Cited

U.S. PATENT DOCUMENTS 6,167,335 A    12/2000  Ide et al.
6,347,268 B1    2/2002  Fujita et al.
(Continued)

FOREIGN PATENT DOCUMENTS

DE    19848997 A1    4/1999
DE    10223522 A1    4/2003
(Continued)

OTHER PUBLICATIONS

Mar. 5, 2018 Office Action issued in German Patent Application No. 102017102751.3.

*Primary Examiner* — Thomas Ingram
(74) *Attorney, Agent, or Firm* — Oliff PLC

(57) ABSTRACT

An activation control device for at least one occupant protection device is applied to a vehicle including occupant protection devices. The activation control device includes a front left sensor, a front right sensor and an activation control unit. The front left sensor is configured to detect an acceleration in a vehicle widthwise direction, and the front right sensor is configured to detect an acceleration in the vehicle widthwise direction. The activation control unit is configured to calculate a movement amount of the front left sensor in the vehicle widthwise direction based on GLy, calculate a movement amount of the front right sensor in the vehicle widthwise direction based on GRy, and determine to which region out of regions each defined in advance for each collision form a point defined by those movement amounts belongs, thereby specifying a collision form.

6 Claims, 20 Drawing Sheets

(52) U.S. Cl.
CPC ............... *B60R 2021/01211* (2013.01); *B60R 2021/01272* (2013.01)

(56) References Cited

U.S. PATENT DOCUMENTS

| | | | |
|---|---|---|---|
| 2002/0016658 A1 | 2/2002 | Imai et al. | |
| 2003/0074111 A1 | 4/2003 | Ugusa et al. | |
| 2004/0201275 A1* | 10/2004 | Imai | B60R 21/0132 307/10.1 |
| 2012/0271509 A1* | 10/2012 | Nehls | B60R 21/0136 701/34.4 |
| 2015/0120147 A1* | 4/2015 | Okamura | B60R 21/0132 701/45 |
| 2016/0140781 A1* | 5/2016 | Lang | B60R 21/0136 701/33.7 |

FOREIGN PATENT DOCUMENTS

| | | |
|---|---|---|
| DE | 60204339 T2 | 1/2006 |
| DE | 102008013780 B3 | 7/2010 |
| JP | H10152014 A | 6/1998 |
| JP | 2001030873 A | 2/2001 |
| JP | 3436185 B2 | 8/2003 |
| JP | 2014-88074 A | 5/2014 |

\* cited by examiner

| | COLLISION FORM | COLLISION SCHEMATIC DIAGRAM | SENSOR LEFT-RIGHT MOVEMENT | | WAVEFORM IN DISCRIMINATION MAP A |
|---|---|---|---|---|---|
| | | | COLLISION SIDE SENSOR | COUNTER COLLISION SIDE SENSOR | |
| (A) | HEAD-ON COLLISION | | NO MOVEMENT (MOVEMENT AMOUNT≒0) | NO MOVEMENT (MOVEMENT AMOUNT≒0) | |
| (B) | POLE COLLISION | | MOVE INSIDE (MOVEMENT AMOUNT: LARGE) | MOVE INSIDE (MOVEMENT AMOUNT: LARGE) | |
| (C) | OFFSET COLLISION | | MOVE INSIDE (MOVEMENT AMOUNT: LARGE) | MOVE OUTSIDE (MOVEMENT AMOUNT: SMALL) | |
| (D) | SMALL OVERLAP COLLISION | | MOVE INSIDE (MOVEMENT AMOUNT: LARGE) | MOVE OUTSIDE (MOVEMENT AMOUNT: MEDIUM) | |
| (E) | OBLIQUE COLLISION | | MOVE INSIDE (MOVEMENT AMOUNT: LARGE) | MOVE OUTSIDE (MOVEMENT AMOUNT: LARGE) | |

RIGHT SENSOR=FRONT RIGHT SENSOR
LEFT SENSOR=FRONT LEFT SENSOR

FIG.3

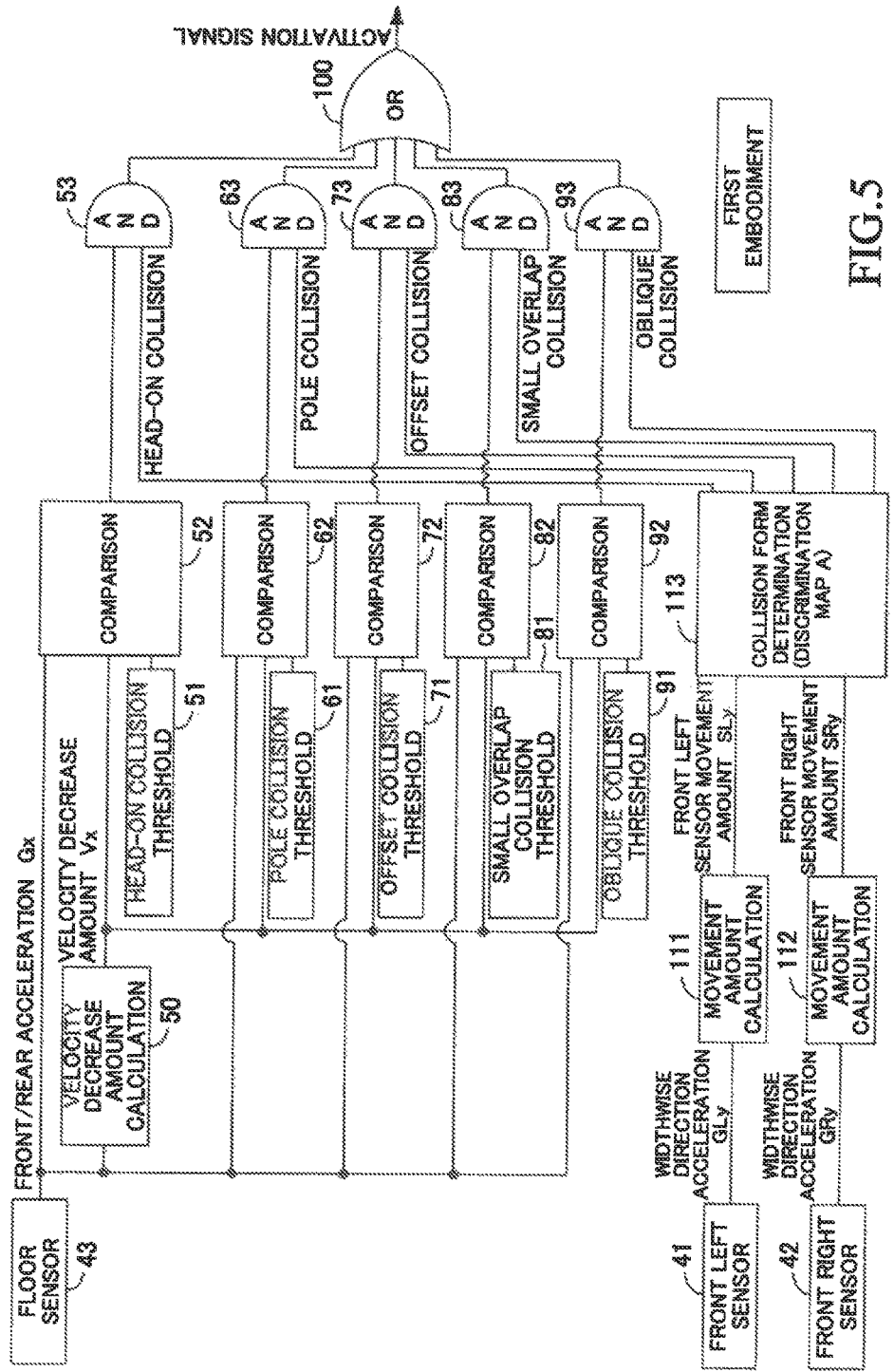

HEAD-ON COLLISION

POLE COLLISION

US 10,131,307 B2

ACTIVATION CONTROL DEVICE FOR OCCUPANT PROTECTION DEVICE

TECHNICAL FIELD

The present invention relates to an activation control device for at least one occupant protection device, which is configured to control activation of at least one "occupant protection device, e.g., an airbag device and a seatbelt retractor" configured to protect occupants in a vehicle when the vehicle collides with an obstacle.

BACKGROUND ART

As illustrated in FIG. 21, one of the "activation control devices for at least one occupant protection device" known hitherto (hereinafter also referred to as "prior-art device") includes a floor sensor FL on a floor of a cabin of a vehicle. Further, the prior-art device includes a left satellite sensor FrL and a right satellite sensor FrR respectively at a front left side portion and a front right side portion of the vehicle.

Those sensors are configured to detect an acceleration in a vehicle front-rear direction applied to the vehicle. The prior-art device is configured to identify a collision form (that is, identify which of head-on collision, oblique collision, offset collision, pole collision and the like the collision form is) of the vehicle based on the detection values of those sensors, and to activate the occupant protection devices based on the identification result (for example, refer to Japanese Patent Application Laid-open No. 2001-30873).

SUMMARY OF THE INVENTION

Incidentally, as illustrated in FIG. 22A, when the head-on collision occurs, a force generated by the collision is directly transmitted to the floor of the cabin via a front member FRM and a pair of side members SDM. Therefore, a magnitude of the acceleration detected by the floor sensor FL starts to rapidly increase at a relatively early timing after occurrence of the collision. As a result, a value correlating with the acceleration detected by the floor sensor FL (e.g., the acceleration itself, an amount of decrease in velocity, which is a first-order integral of the acceleration and a movement amount, which is a second-order integral of the acceleration) exceeds a collision determination threshold at a relatively early timing after the occurrence of the collision (that is, an activation condition is satisfied), and therefore the occupant protection devices are activated at an appropriate timing.

In contrast, as illustrated in FIG. 22B, when the pole collision occurs, the front member FRM bends, and thus a force generated by the collision is less likely to be transmitted to the cabin via the pair of side members SDM. Therefore, after a pole Po abuts against an engine arranged in an engine compartment and the engine subsequently reaches the cabin, the magnitude of the acceleration detected by the floor sensor FL starts to rapidly increase. Meanwhile, when the occurrence of the head-on collision and the occurrence of the pole collision cannot be distinguished from each other, the collision determination threshold is maintained at a value for the head-on collision. As a result, the activation of the occupant protection devices may be delayed when the pole collision occurs.

Therefore, it is preferred to reliably determine the collision form, and to change the collision determination threshold (in other words, the activation condition for the occupant protection devices) in correspondence to the determined collision form.

Meanwhile, the left satellite sensor FrL and the right satellite sensor FrR are generally arranged on the front member FRM. Therefore, as illustrated in FIG. 22B, acceleration detection directions of the left satellite sensor FrL and the right satellite sensor FrR are changed to directions crossing the vehicle front-rear direction by the bend of the front member FRM caused by the pole collision. As a result, the accelerations detected by the left satellite sensor FrL and the right satellite sensor FrR do not increase that much when the pole collision occurs, and become equivalent in magnitude to the accelerations detected by the left satellite sensor FrL and the right satellite sensor FrR when the head-on collision occurs at a relatively low velocity. Thus, the prior-art device cannot clearly distinguish the pole collision and the head-on collision at a low velocity from each other, and hence the collision determination threshold cannot be decreased when the pole collision occurs. As a result, it is difficult to advance the activation timing of the occupant protection devices.

As appreciated from the above-mentioned example, there is room for improvement of the prior-art device in terms of precision of determining the collision form. Further, waveforms of the accelerations detected by the left satellite sensor FrL and the right satellite sensor FrR are similar to each other, for example, among the offset collision, a small overlap collision and the oblique collision. Therefore, it is also difficult to precisely distinguish those collision forms from one another. It should be noted that the occupant protection devices (in particular, the airbag) do not need to deploy when the head-on collision occurs at a low velocity. Hence, also in consideration of this point, it is important to more reliably specify the collision form.

The present invention has been made to resolve the above-mentioned problem. That is, one of objects of the present invention is to provide an activation control device for at least one occupant protection device, which is capable of more precisely discriminating between collision forms, thereby carrying out "more appropriate activation control (control of activating the occupant protection devices at a timing in correspondence to the collision form)".

An activation control device for at least one occupant protection device according to the present invention (hereinafter also referred to as "the present invention device") is applicable to a vehicle including at least one occupant protection device (21 to 28, 31 to 34) and at least one activation device (21a to 28a, 31a to 34a) configured to activate the at least one occupant protection device.

The present invention device includes:
a front left sensor (41) fixed to a front left side portion of the vehicle;
a front right sensor (42) fixed to a front right side portion of the vehicle; and
an activation control unit (45) configured to determine whether or not a predetermined activation condition is satisfied, and use the at least one activation device to activate the at least one occupant protection device when it is determined that the predetermined activation condition is satisfied.

Further, the front left sensor is configured to detect a first lateral acceleration (GLy), which is an acceleration in a vehicle widthwise direction of the front left sensor,
the front right sensor is configured to detect a second lateral acceleration (GRy), which is an acceleration in the vehicle widthwise direction of the front right sensor, and
the activation control unit is configured to:

calculate a first movement amount (SLy) representing a movement amount in the vehicle widthwise direction of the front left sensor based on the first lateral acceleration (111);

calculate a second movement amount (SRy) representing a movement amount in the vehicle widthwise direction of the front right sensor based on the second lateral acceleration (112);

determine to which region out of regions each defined in advance for each collision form (see FIG. 4A) a point defined by the first movement amount and the second movement amount belongs, to thereby specify that the collision form is a collision form corresponding to the region to which the point belongs (113); and set the activation condition in correspondence to the specified collision form (51 to 53, 61 to 63, 71 to 73, 81 to 83, 91 to 93, 100).

According to investigation conducted by the inventors of the present invention, as shown in FIG. 3, the point defined by the first movement amount (left sensor movement amount SLy) and the second movement amount (right sensor movement amount SRy) draws specific loci respectively corresponding to the collision forms. Thus, the collision form can precisely be specified (discriminated) by determining to which of regions defined in advance (refer to FIG. 4A) the point belongs. As a result, the activation condition for the occupant protection device can be changed to an appropriate condition corresponding to the collision form, and thus the occupant protection device can be activated at an appropriate timing.

In one aspect of the present invention:

the activation control device for at least one occupant protection device further includes a floor sensor (43) fixed on a floor of a cabin of the vehicle and configured to detect a floor acceleration (Gx) which is an acceleration in a vehicle front-rear direction; and the activation control unit is configured to:

calculate an actual velocity decrease amount (Vx) of the floor sensor based on the detected floor acceleration (50);

determine that the activation condition is satisfied when the detected floor acceleration corresponding to the actual velocity decrease amount of the floor sensor is equal to or more than an activation threshold that changes in correspondence to the actual velocity decrease amount of the floor sensor; and store, in advance, a relationship between the velocity decrease amount of the floor sensor and the activation threshold for each collision form (51, 61, 71, 81, 91 (see lines L1 to L5)), and set the activation threshold based on the relationship corresponding to the specified collision form and the actual velocity decrease amount of the floor sensor, to thereby set the activation condition in correspondence to the specified collision form (52, 62, 72, 82, 92, 53, 63, 73, 83, 93, 100).

The velocity decrease amount of the floor sensor is calculated by practically integrating (adding up) the floor acceleration with respect to time.

According to this aspect, the activation condition corresponding to the collision form can be finely set based on the "velocity decrease amount of the floor sensor and the floor acceleration", and hence the occupant protection device can be activated at a more appropriate timing.

Further, in one aspect of the present invention:

the front left sensor is configured to detect an acceleration in a direction which the front left sensor moves toward an inside of the vehicle as a positive acceleration;

the front right sensor is configured to detect an acceleration in a direction which the front right sensor moves toward an inside of the vehicle as a positive acceleration; and the activation control unit is configured to:

define, in advance, in a coordinate system in which the first movement amount is set to a horizontal axis and the second movement amount is set to a vertical axis, a region including an origin of the coordinate system as a head-on collision region, which is a region corresponding to a head-on collision (discrimination map A);

define, in advance, in the coordinate system, a region that includes a straight line on which both the first movement amount and the second movement amount are positive values and change while a one-to-one relationship (directly proportional relationship) is maintained, and does not include the head-on collision region, as a pole collision region, which is a region corresponding to a pole collision (discrimination map A);

set the activation condition as a predetermined head-on collision activation condition when the point is in the head-on collision region (113, 53); and change the activation condition to a predetermined pole collision activation condition when the point is determined to have entered the pole collision region from the head-on collision region (113, 63, Step 1135 to Step 1175).

The first movement amount and the second movement amount are approximately zero when the head-on collision occurs. Thus, the point defined by the first movement amount and the second movement amount when the head-on collision occurs remains in a neighborhood of the origin in the coordinate system in which the first movement amount is set to the horizontal axis and the second movement amount is set to the vertical axis. In contrast, the first movement amount and the second movement amount have magnitudes that gradually increase while being approximately equal to each other when the pole collision occurs. Thus, the point defined by the first movement amount and the second movement amount when the pole collision occurs belongs to the region that includes the straight line on which both the first movement amount and the second movement amount are positive values and change while maintaining the one-to-one relationship (directly proportional relationship) in the coordinate system. Thus, according to the above-mentioned embodiment, the collision form can precisely be discriminated between the head-on collision and the pole collision.

Further, in one aspect of the present invention, the vehicle includes a plurality of the occupant protection devices, and a plurality of the activation devices. In this case, each of the plurality of the activation devices is configured to be capable of independently activating each of the plurality of the occupant protection devices, and the activation control unit is configured to select an occupant protection device to be activated out of the plurality of the occupant protection devices in correspondence to the specified collision form (200A, 200B and the like).

According to this aspect, only appropriate occupant protection devices can be activated in correspondence to the collision form. Thus, for example, a repair cost after the vehicle collision can be decreased.

In the description given above, in order to facilitate understanding of the present invention, names and/or reference symbols in parentheses used in embodiments of the present invention described later are added to components of the invention corresponding to the embodiments. However, respective components of the present invention are not limited to the embodiments prescribed by the reference symbols. Other objects, other features, and accompanying advantages of the present invention can be readily understood from a description of the embodiments of the present invention provided referring to the accompanying drawings.

BRIEF DESCRIPTION OF THE DRAWINGS

FIG. 3 is a table for showing respective relationships between a collision form and a locus of a point determined by a vehicle widthwise direction (vehicle left-right direction) movement amount of a front left sensor and a vehicle widthwise direction (vehicle left-right direction) movement amount of a front right sensor.

FIG. 5 is a functional block diagram for illustrating logic of "activation control for occupant protection devices" of the first device.

DESCRIPTION OF THE EMBODIMENTS

A description is now given of activation control devices (hereinafter also referred to as "present control devices") for occupant protection devices according to embodiments of the present invention with reference to the drawings.

(Configuration)

Figure 1:
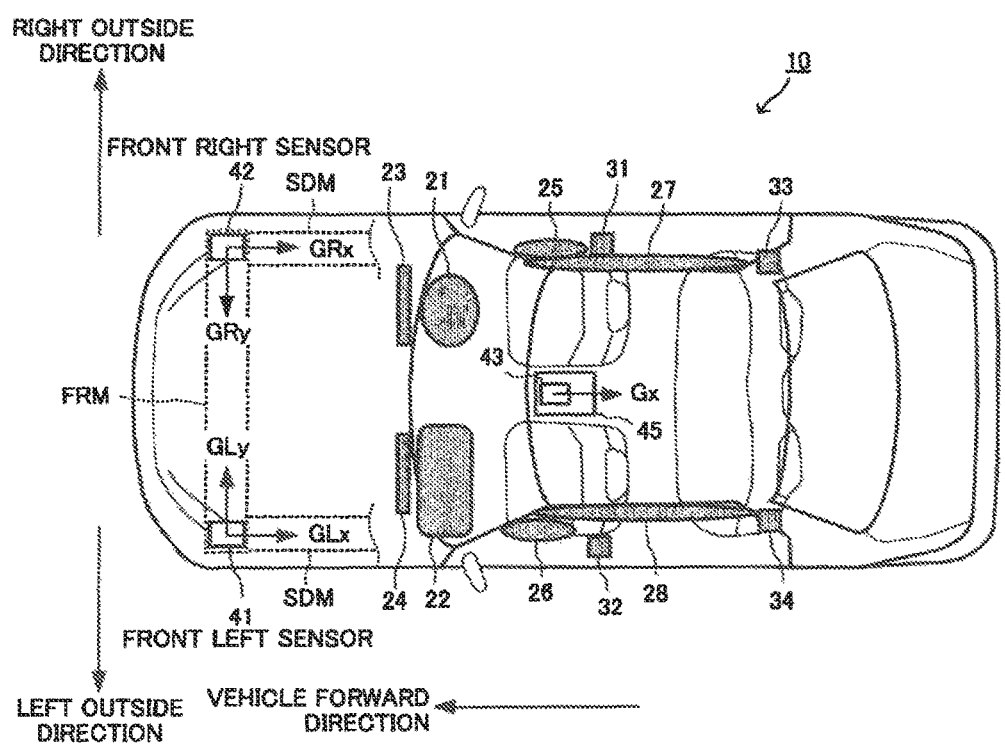
FIG. 1 is a schematic configuration diagram for illustrating a vehicle in which an activation control device for occupant protection devices according to a first embodiment of the present invention (first device) is mounted.

The present control device according to a first embodiment of the present invention (hereinafter also referred to as "first device") is applied to a vehicle 10 illustrated in FIG. 1. The vehicle 10 includes a driver's seat airbag 21, a passenger's seat airbag 22, a driver's seat knee airbag 23, a passenger's seat knee airbag 24, a driver's seat side airbag 25, a passenger's seat side airbag 26, a driver's-seat-side curtain airbag 27 and a passenger's-seat-side curtain airbag 28. Those airbags are widely known as occupant protection devices, and hence a detailed description thereof is omitted.

Further, the vehicle 10 includes a driver's seat seatbelt pretensioner 31, a passenger's seat seatbelt pretensioner 32, a rear right seat seatbelt pretensioner 33, and a rear left seat seatbelt pretensioner 34. Those pretensioners are also widely known as occupant protection devices, and hence a detailed description thereof is omitted.

The first device includes a front left sensor (front left side acceleration sensor) 41, a front right sensor (front right side acceleration sensor) 42, a floor sensor (floor acceleration sensor) 43, other sensors 44 (for example, a vehicle velocity sensor, not shown in FIG. 1) and an airbag ECU (activation control ECU) 45. In the following, a widthwise direction of the vehicle 10 is also referred to as "vehicle widthwise direction", "vehicle left-right direction" or "left-right direction", and a front-rear direction of the vehicle 10 is also referred to as "vehicle front-rear direction" or "front-rear direction".

The front left sensor 41 is fixed to (arranged on) a front left side portion of the vehicle 10. The front left sensor 41 is actually fixed to a left end of a front member FRM extending in the vehicle widthwise direction in a vicinity of a front end of the vehicle 10. Both left and right ends of the front member are coupled to a pair of side members SDM extending in the vehicle front-rear direction.

The front left sensor 41 is configured to detect an acceleration in the vehicle front-rear direction acting on the front left sensor 41 itself (hereinafter referred to as "front/rear acceleration GLx"). The front/rear acceleration GLx is set to represent an acceleration toward a vehicle rear direction as a positive value.

The front left sensor 41 is configured to further detect an acceleration in the vehicle widthwise direction acting on the front left sensor 41 itself (hereinafter referred to as "widthwise direction acceleration GLy" or "first lateral acceleration GLy"). The widthwise direction acceleration GLy is set to represent an acceleration toward an inside of the vehicle (namely, a right direction with respect to a forward direction of the vehicle) as a positive value.

The front right sensor 42 is fixed to (arranged on) a front right side portion of the vehicle 10. The front right sensor 42 is actually fixed to a right end of the front member FRM.

The front right sensor 42 is configured to detect an acceleration in the vehicle front-rear direction acting on the front right sensor 42 itself (hereinafter referred to as "front/rear acceleration GRx"). The front/rear acceleration GRx is set to represent an acceleration toward the vehicle rear direction as a positive value.

The front right sensor 42 is configured to further detect an acceleration in the vehicle widthwise direction acting on the front right sensor 42 itself (hereinafter referred to as "widthwise direction acceleration GRy" or "second lateral acceleration GRy"). The widthwise direction acceleration GRy is set to represent an acceleration toward an inside of the vehicle (namely, a left direction with respect to the forward direction of the vehicle) as a positive value.

The floor sensor 43 is fixed to a floor constituting a cabin (namely, a vehicle body floor constituting member of a vehicle body center portion). The floor sensor 43 is configured to detect an acceleration in the vehicle front-rear direction acting on the floor sensor 43 itself (hereinafter referred to as "floor acceleration Gx"). The floor acceleration Gx is set to represent an acceleration toward the vehicle rear direction as a positive value.

Figure 2:
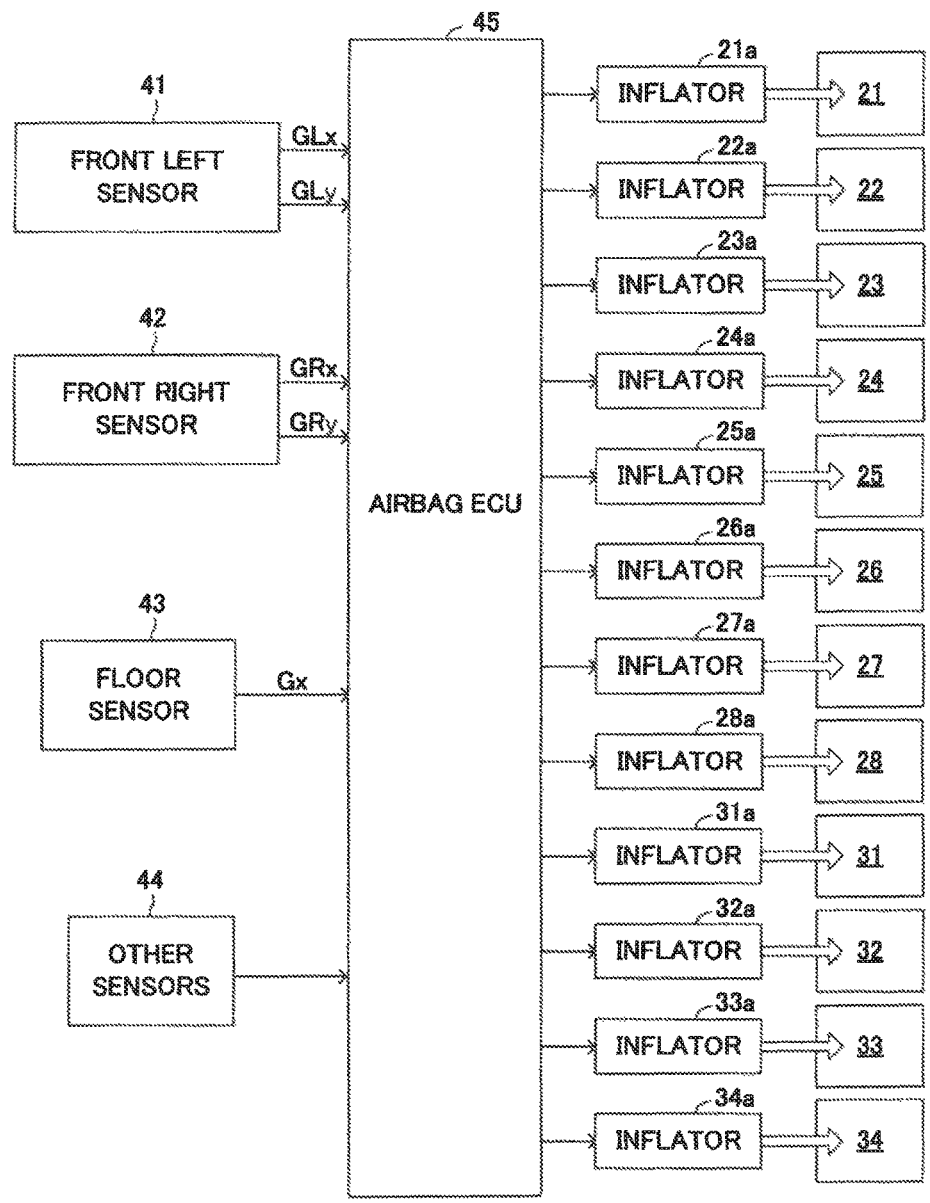
FIG. 2 is an electric block diagram for illustrating the first device illustrated in FIG. 1.

As illustrated in the block diagram of FIG. 2, inflators 21*a* to 28*a* are respectively installed as activation devices in the aforementioned airbags 21 to 28. Similarly, inflators 31*a* to 34*a* are respectively installed as activation devices in the aforementioned pretensioners 31 to 34. Each of the inflators 21*a* to 28*a* and the inflators 31*a* to 34*a* is configured to activate the corresponding occupant protection device upon a reception of an activation signal. In other words, each of the inflators 21*a* to 28*a* is configured to deploy the corresponding airbag in response to the activation signal. Each of the inflators 31*a* to 34*a* is configured to activate the corresponding device for retracting the seatbelt (the corresponding pretensioner) in response to the activation signal.

The airbag ECU 45 (hereinafter also simply referred to as "ECU 45") is fixed to the floor constituting the cabin. The ECU 45 is connected to the front left sensor 41, the front right sensor 42 and the floor sensor 43, and is configured to receive the respective accelerations detected by those sensors. The ECU 45 is also connected to the other sensors 44, and is configured to receive detection signals output by the other sensors 44. Further, the ECU 45 is connected to the inflators 21*a* to 28*a* and the inflators 31*a* to 34*a*, and is configured to transmit the activation signals thereto.

ECU is an acronym for "electric control unit", and is an electronic control circuit including a microcomputer including a CPU, a ROM, a RAM an interface and so on as main components. The CPU executes instructions (routines and programs) stored in the memory (ROM) to implement various functions (control).

(Overview of Activation: Identification Method for Collision Forms)

A description is now given of an identification method for collision forms employed by the ECU 45 of the first device. A prior-art activation control device is configured to use the front-rear direction acceleration GLx detected by the front left sensor 41 and the front-rear direction acceleration GRx detected by the front right sensor 42 to identify the collision forms. In contrast, the ECU 45 is configured to use the widthwise direction acceleration GLy detected by the front left sensor 41 and the widthwise direction acceleration GRy detected by the front right sensor 42 to identify the collision forms. The ECU 45 may be configured, as with the prior-art activation control device, to additionally use the front-rear direction acceleration GLx and the front-rear direction acceleration GRx to identify the collision forms.

More specifically, the ECU 45 is configured to substantially calculate second-order integral of (configured to add up) the widthwise direction acceleration GLy detected by the front left sensor 41 with respect to time t, thereby calculating a movement amount SLy(t) in the vehicle widthwise direction of the vehicle body portion to which the front left sensor 41 is mounted (hereinafter also referred to as "left sensor movement amount", "left sensor widthwise direction movement amount" or "first movement amount"). Similarly, the ECU 45 is configured to substantially calculate the second-order integral of (configured to add up) the widthwise direction acceleration GRy detected by the front right sensor 42 with respect to the time t, thereby calculating a movement amount SRy(t) in the vehicle widthwise direction of the vehicle body portion to which the front right sensor 42 is mounted (hereinafter also referred to as "right sensor movement amount", "right sensor widthwise direction movement amount" or "second movement amount").

FIG. 3 is a table for showing respective relationships between the collision form and a locus of a point determined by the left sensor movement amount and the right sensor movement amount. A description is now given of each of the collision forms. It should be noted that a "discrimination map A" of FIG. 3 is a graph in which a horizontal axis (X axis) represents the left sensor movement amount and a vertical axis (Y axis) represents the right sensor movement amount, and is stored in the ROM. Further, "waveform in discrimination map A" of FIG. 3 is a locus drawn by a point P (=(SLy(t), SRy(t)) determined by the left sensor movement amount SLy(t) and the right sensor movement amount SRy(t) as time t elapses.

<Head-on Collision>

When the collision form is a head-on collision shown in (A) of FIG. 3, accelerations in the vehicle front-rear direction substantially equal to each other in magnitude and direction are generated in the front left sensor 41 and the front right sensor 42, but an acceleration in the vehicle widthwise direction is hardly generated (that is, approximately "0"). Thus, both of the "left sensor movement amount SLy(t) of the front left sensor 41 and the right sensor movement amount SRy(t) of the front right sensor 42" after occurrence of the head-on collision are approximately "0". Therefore, the waveform of the point P after the occurrence of the head-on collision remains in a neighborhood of an origin of the discrimination map A.

<Pole Collision>

Figure 22A:
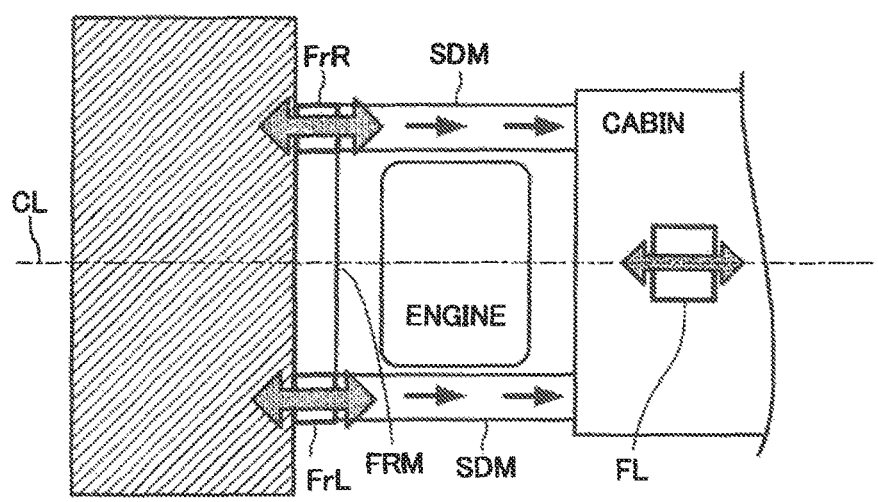
FIG. 22A is a partial plan view of the vehicle for illustrating a state when a head-on collision occurs.
Figure 22B:
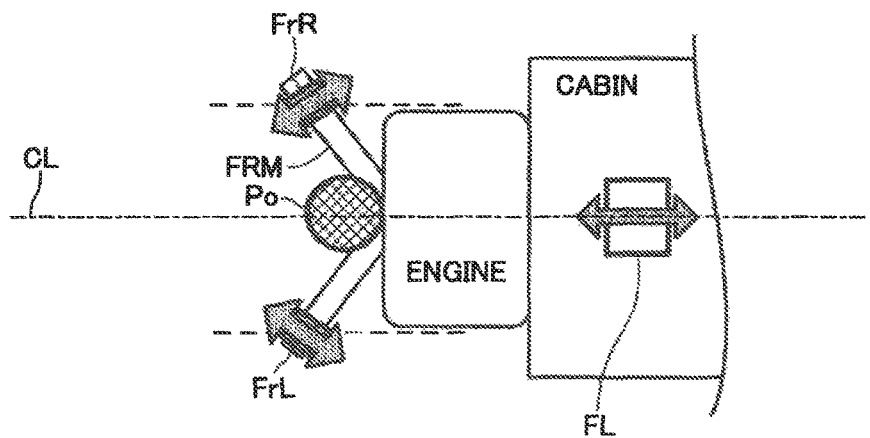
FIG. 22B is a partial plan view of the vehicle for illustrating a state when a pole collision occurs.

When the collision form is a pole collision shown in (B) of FIG. 3, a center portion of the vehicle body deforms backward of the vehicle body, and the front portion of the vehicle body (front member FRM) bends (refer to FIG. 22B). Therefore, the front left sensor 41 and the front right sensor 42 respectively move in directions (hereinafter referred to as "vehicle inside directions") toward a center line CL in the vehicle widthwise direction extending in the front-rear direction of the vehicle. Thus, the "left sensor movement amount SLy(t) and the right sensor movement amount SRy(t)" after occurrence of the pole collision are approximately equal to each other. In other words, when the left sensor movement amount SLy(t) increases by a value Δ, the right sensor movement amount SRy(t) also increases by a value substantially equal to the value Δ. Therefore, as illustrated in (B) of FIG. 3, the locus of the point P after the occurrence of the pole collision draws a waveform in which the right sensor movement amount SRy(t) and the left sensor movement amount SLy(t) maintain a directly proportional relationship (that is, are both positive values and change while maintaining a one-to-one relationship). Further, the point P departs from the origin as time elapses.

<Offset Collision: Offset Deformable Barrier (ODB) Collision>

When the collision form is an offset collision shown in (C) of FIG. 3, a sensor on a side that collides with a barrier (hereinafter referred to as "collision side sensor") greatly moves toward the vehicle inside direction, and a sensor on a side that has not collided with the barrier (hereinafter referred to as "counter collision side sensor") slightly moves toward a direction (hereinafter referred to as "vehicle outside direction") departing from the center line CL in the vehicle widthwise direction.

More specifically, when the collision form is the offset collision, and the vehicle front left side collides with a barrier (that is, in a case of a left side offset collision), the front left sensor 41 moves relatively greatly toward the vehicle inside direction (namely, the right direction), and the front right sensor 42 moves relatively slightly toward the vehicle outside direction (namely, the right direction). Thus, after occurrence of the left side offset collision, the locus of the point P draws a waveform substantially along the horizontal axis as represented by a solid line in (C) of FIG. 3. Further, the point P departs from the origin as time elapses.

When the collision form is the offset collision, and the vehicle front right side collides with a barrier (that is, in a case of a right side offset collision), the front right sensor 42 moves relatively greatly toward the vehicle inside direction (namely, the left direction), and the front left sensor 41 moves relatively slightly toward the vehicle outside direction (namely, the left direction). Thus, after occurrence of the right side offset collision, the locus of the point P draws a waveform substantially along the vertical axis as represented by a broken line in (C) of FIG. 3. Further, the point P departs from the origin as time elapses.

<Small Overlap Collision>

When the collision form is a small overlap collision shown in (D) of FIG. 3, the collision side sensor greatly moves toward the vehicle inside direction, and the counter collision side sensor moves by an amount smaller than that of the "collision side sensor" toward the vehicle outside direction (moves by an amount more than that of the counter collision side sensor when the offset collision occurs).

More specifically, when the collision form is the small overlap collision, and the vehicle front left side collides with a barrier (that is, in a case of a left side small overlap collision), the front left sensor 41 moves relatively greatly toward the vehicle inside direction (namely, the right direction), and the front right sensor 42 moves by an amount at a medium degree toward the vehicle outside direction (namely, the right direction). Thus, after occurrence of the left side small overlap collision, the locus of the point P draws a waveform in a fourth quadrant as represented by a solid line in (D) of FIG. 3. A magnitude of an average of a gradient of the waveform is more than a magnitude of an average of a gradient of the waveform after the occurrence of the left side offset collision. Further, the point P departs from the origin as time elapses.

When the collision form is the small overlap collision, and the vehicle front right side collides with a barrier (that is, in a case of a right side small overlap collision), the front right sensor 42 moves relatively greatly toward the vehicle inside direction (namely, the left direction), and the front left sensor 41 moves by an amount at a medium degree toward the vehicle outside direction (namely, the left direction). Thus, after occurrence of the right side small overlap collision, the locus of the point P draws a waveform in a second quadrant as represented by a broken line in (D) of FIG. 3. A magnitude of an average of a gradient of the waveform is less than a magnitude of an average of a gradient of the waveform after the occurrence of the right side offset collision. Further, the point P departs from the origin as time elapses.

<Oblique Collision>

When the collision form is an oblique collision shown in (E) of FIG. 3, the collision side sensor greatly moves toward the vehicle inside direction, and the counter collision side sensor greatly moves toward the vehicle outside direction (moves more greatly than the counter collision side sensor does when the small overlap collision occurs).

More specifically, when the collision form is the oblique collision, and the vehicle front left side collides with a barrier (that is, in a case of a left side oblique collision), the front left sensor 41 moves greatly toward the vehicle inside direction (namely, the right direction), and the front right sensor 42 also moves greatly toward the vehicle outside direction (namely, the right direction). Thus, after occurrence of the left side oblique collision, the locus of the point P draws a waveform in the fourth quadrant as represented by a solid line in (E) of FIG. 3. A magnitude of an average of a gradient of the waveform is more than the magnitude of the average of the gradient of the waveform after the occurrence of the left side small overlap collision. Further, the point P departs from the origin as time elapses.

When the collision form is the oblique collision, and the vehicle front right side collides with a barrier (that is, in a case of a right side oblique collision), the front right sensor 42 moves greatly toward the vehicle inside direction (namely, the left direction), and the front left sensor 41 also moves greatly toward the vehicle outside direction (namely, the left direction). Thus, after occurrence of the right side oblique collision, the locus of the point P draws a waveform in the second quadrant as represented by a broken line in (E) of FIG. 3. A magnitude of an average of a gradient of the waveform is less than the magnitude of the average of the gradient of the waveform after the occurrence of the right side small overlap collision. Further, the point P departs from the origin as time elapses.

Figure 4A:
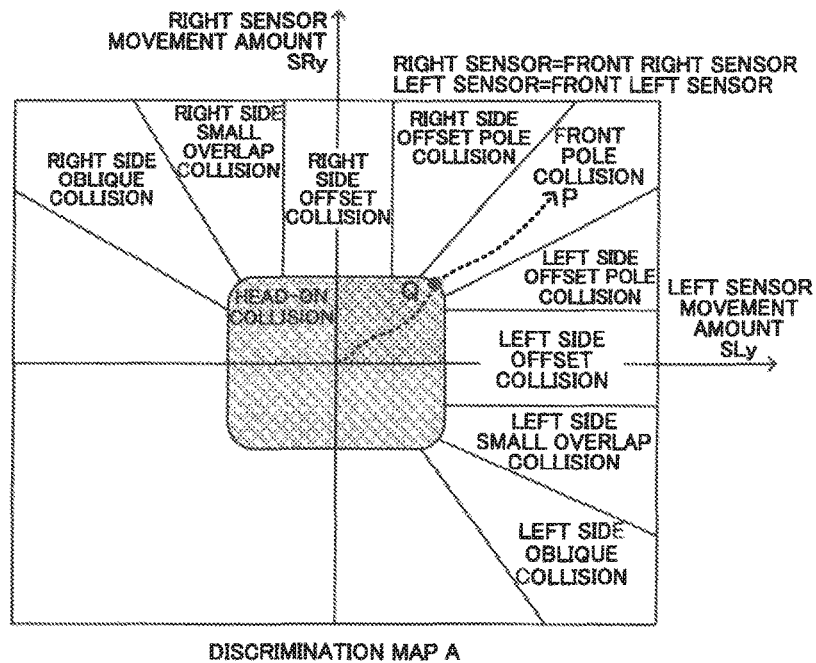
FIG. 4A is a map to which a CPU of the first device refers when the CPU discriminates the collision form.
Figure 4B:
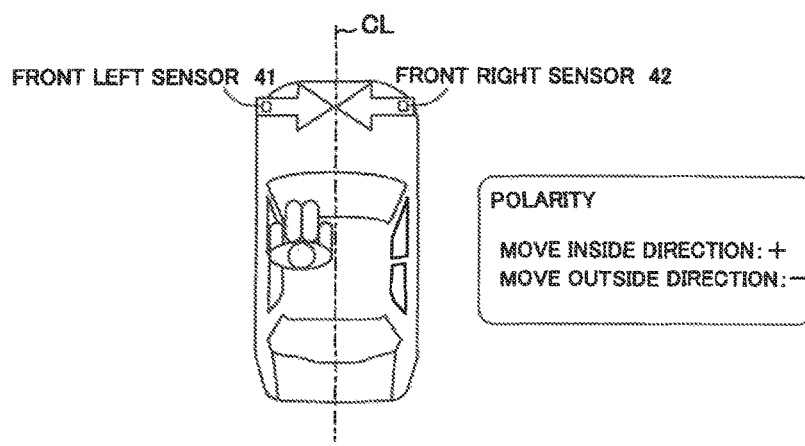
FIG. 4B is a schematic plan view for illustrating the vehicle to which the first device is applied.

As described above, the locus of the point P draws a waveform specific to each of the collision forms. The first device is configured to identify the collision form based on this viewpoint. That is, a "discrimination map A (collision form identification map)" illustrated in FIG. 4A is generated in advance, and the discrimination map A is stored in the ROM of the ECU 45. This discrimination map A is a map having the same axes as those of the discrimination map A of FIG. 3, and regions corresponding to the collision forms are set in advance in the discrimination map A. It should be noted that a front pole collision, a right side offset pole collision and a left side offset pole collision are treated as "pole collision" in the first device. Further, the right side offset collision and the left side offset collision are treated as "offset collision". The right side small overlap collision and the left side small overlap collision are treated as "small overlap collision", and the right side oblique collision and the left side oblique collision are treated as "oblique collision".

The ECU 45 is configured to monitor in which region of the discrimination map A the point P=(SLy,SRy) exists, and determine that the collision form is "a collision corresponding to the region in which the point P exists".

For example, when the point P moves as illustrated by a broken line in FIG. 4A, the point P initially exists in a head-on collision region, and hence the ECU 45 determines that the head-on collision is occurring. Then, when the point P is subsequently determined to have entered a front pole collision region (that is, determined to have passed through a point Q), the ECU 45 determines that the pole collision (front pole collision) has occurred. That is, the ECU 45 identifies the collision form as the front pole collision.

(Overview of Activation Control Logic)

Referring to FIG. 5, a description is now given of an activation control logic for the occupant protection devices according to the first device. Respective functional blocks illustrated in FIG. 5 are actually implemented by the CPU of the ECU 45 executing the programs.

A velocity decrease amount calculation unit 50 is configured to receive the front/rear acceleration Gx detected by the floor sensor 43, and calculate a velocity decrease amount (change amount of a velocity) Vx based on the front/rear acceleration Gx in accordance with a following Equation (1) each time a predetermined period Δts elapses. Vxold is the velocity decrease amount Vx calculated the predetermined period Δts before (namely, a previous value of the velocity decrease amount Vx). The unit of Vx is [m/s].

$$Vx=(1-A)\cdot Vxold+\Delta ts\cdot Gx \quad (1)$$

Note that A is a constant taking following values. A value of A is appropriately changed depending on vehicles. [G] is a gravitational acceleration.

When front/rear acceleration Gx≤2 [G]: $A=2^{-4}$
When front/rear acceleration Gx>2 [G]: $A=2^{-9}$ The above Equation (1) is an equation for integrating the front/rear acceleration Gx substantially with respect to time (integrating with respect to time) to calculate the velocity decrease amount Vx. It should be noted that when Gx>2 [G], the collision is considered to have been progressing, and reliability of the front/rear acceleration Gx is thus decreased. Therefore, the value of A is set to be an extremely small value so that a velocity which is an integral of the front/rear acceleration Gx is relatively small.

Figure 6:
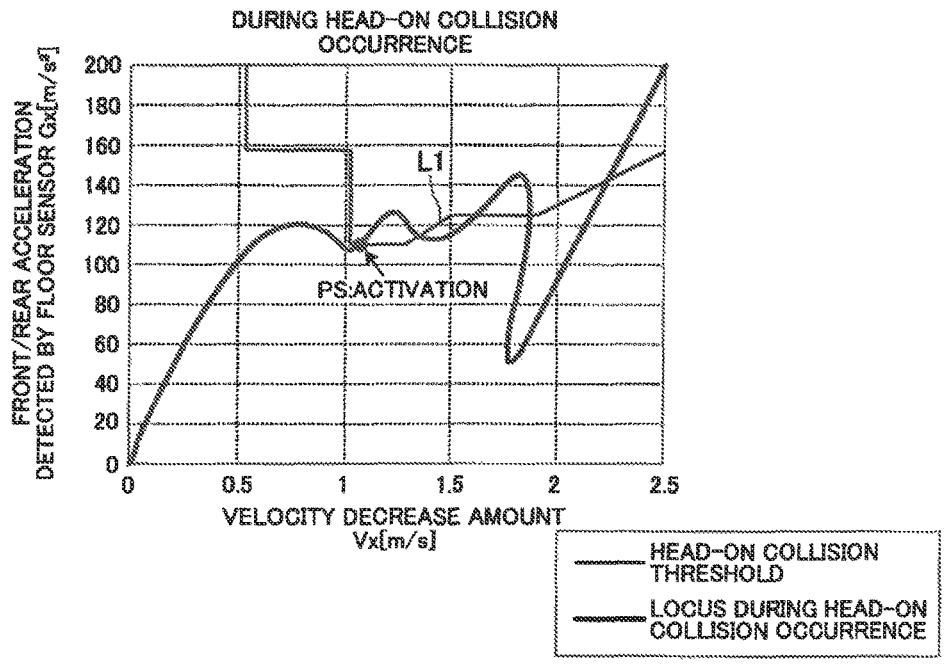
FIG. 6 is a graph for showing a relationship between a vehicle front/rear acceleration detected by a floor sensor when a head-on collision occurs and a velocity decrease amount calculated from the vehicle front/rear acceleration.

A head-on collision threshold generation unit 51 is configured to generate "a head-on collision threshold" that changes as represented by a solid straight line L1 in FIG. 6. The head-on collision threshold defines a threshold for the front/rear acceleration (Gx) corresponding to the velocity decrease amount (Vx), is experimentally determined in advance and is stored in the ROM. The head-on collision threshold is one kind of collision determination thresholds, and is set so as to start changing synchronously with a time point at which the actual velocity decrease amount Vx calculated by the velocity decrease amount calculation unit 50 increases from "0". It should be noted that each of collision determination thresholds described later (that is, a pole collision threshold, an offset collision threshold, a small overlap collision threshold, and an oblique collision determination threshold) also defines a threshold for the front/rear acceleration (Gx) corresponding to the velocity decrease amount (Vx). Those thresholds are also experimentally defined in advance, are stored in the ROM, and are set so as to start changing synchronously with the time point at which the actual velocity decrease amount Vx calculated by the velocity decrease amount calculation unit 50 increases from "0".

A comparison unit 52 is configured to receive and compare the front/rear acceleration Gx, the velocity decrease amount Vx and the head-on collision threshold. More specifically, the comparison unit 52 switches an output signal from a low level signal to a high level signal at a time point when the front/rear acceleration Gx corresponding to the velocity decrease amount Vx crosses the head-on collision threshold from a lower side to an upper side for the first time (refer to a point PS of FIG. 6).

An AND circuit unit 53 is configured to receive the output signal from the comparison unit 52 and a head-on collision determination result signal from a collision form determination unit 113. The head-on collision determination result signal becomes a high level signal while the collision form determination unit 113 determines that the collision form is the head-on collision by using the above-mentioned discrimination map A. Thus, the AND circuit unit 53 is configured to output a high level signal at a time point when the collision form is determined to be the head-on collision, and when the front/rear acceleration Gx corresponding to the velocity decrease amount Vx crosses the head-on collision threshold from the lower side to the upper side for the first time.

Figure 7:
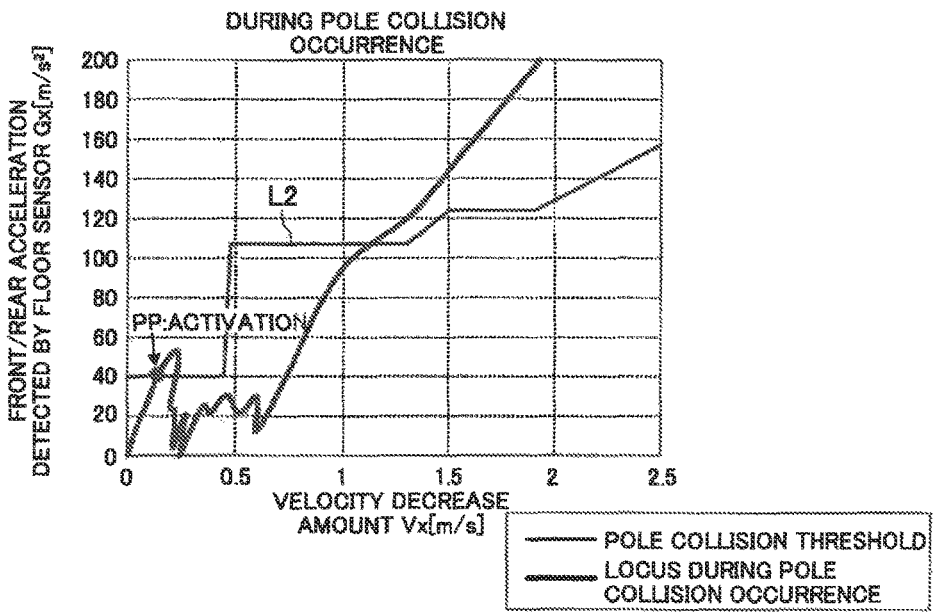
FIG. 7 is a graph for showing a relationship between the vehicle front/rear acceleration detected by the floor sensor when a pole collision occurs and the velocity decrease amount calculated from the vehicle front/rear acceleration.

The pole collision threshold generation unit 61 is configured to generate the "pole collision threshold" that changes as represented by a solid straight line L2 in FIG. 7.

A comparison unit 62 is configured to receive and compare the front/rear acceleration Gx, the velocity decrease amount Vx and the pole collision threshold. More specifically, the comparison unit 62 switches an output signal from a low level signal to a high level signal at a time point when the front/rear acceleration Gx corresponding to the velocity decrease amount Vx crosses the pole collision threshold from a lower side to an upper side for the first time (refer to a point PP of FIG. 7).

An AND circuit unit 63 is configured to receive the output signal from the comparison unit 62 and a pole collision determination result signal from the collision form determination unit 113. The pole collision determination result signal becomes a high level signal while the collision form determination unit 113 determines that the collision form is the pole collision (either one of the front pole collision, the left side offset pole collision and the right side offset pole collision) by using the above-mentioned discrimination map A. Thus, the AND circuit unit 63 is configured to output a high level signal at a time point when the collision form is determined to be the pole collision, and when the front/rear acceleration Gx corresponding to the velocity decrease amount Vx crosses the pole collision threshold from the lower side to the upper side for the first time.

Figure 8:
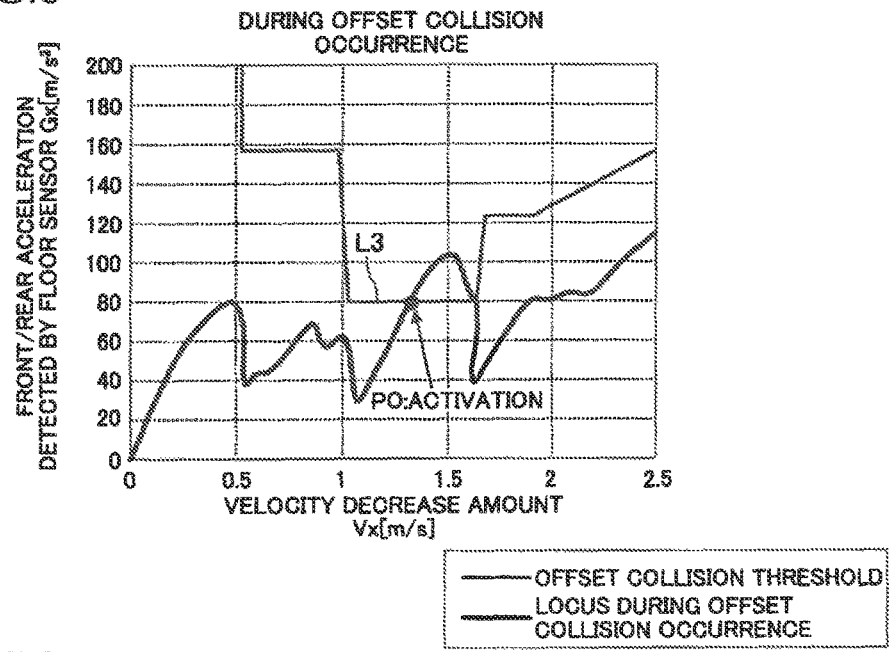
FIG. 8 is a graph for showing a relationship between the vehicle front/rear acceleration detected by the floor sensor when an offset collision occurs and the velocity decrease amount calculated from the vehicle front/rear acceleration.

An offset collision threshold generation unit 71 is configured to generate the "offset collision threshold" that changes as represented by a solid straight line L3 in FIG. 8.

A comparison unit 72 is configured to receive and compare the front/rear acceleration Gx, the velocity decrease amount Vx and the offset collision threshold. More specifically, the comparison unit 72 switches an output signal from a low level signal to a high level signal at a time point when the front/rear acceleration Gx corresponding to the velocity decrease amount Vx crosses the offset collision threshold from a lower side to an upper side for the first time (refer to a point PO of FIG. 8).

An AND circuit unit 73 is configured to receive the output signal from the comparison unit 72 and an offset collision determination result signal from the collision form determination unit 113. The offset collision determination result signal becomes a high level signal while the collision form determination unit 113 determines that the collision form is the offset collision (either one of the left side offset collision and the right side offset collision) by using the above-mentioned discrimination map A. Thus, the AND circuit unit 73 is configured to output a high level signal at a time point when the collision form is determined to be the offset collision, and when the front/rear acceleration Gx corresponding to the velocity decrease amount Vx crosses the offset collision threshold from the lower side to the upper side for the first time.

Figure 9:
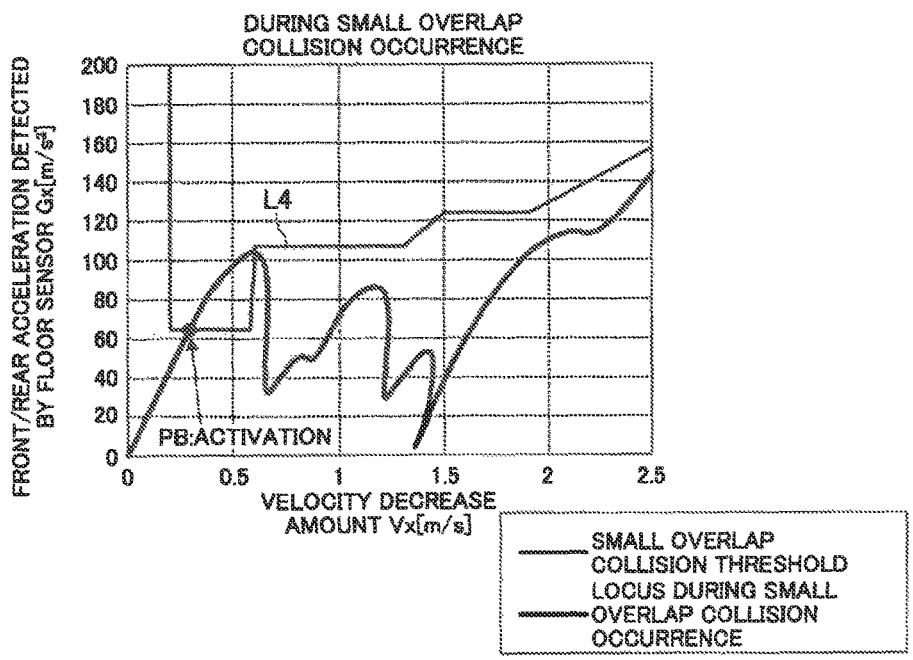
FIG. 9 is a graph for showing a relationship between the vehicle front/rear acceleration detected by the floor sensor when a small overlap collision occurs and the velocity decrease amount calculated from the vehicle front/rear acceleration.

A small overlap collision threshold generation unit 81 is configured to generate the "small overlap collision threshold" that changes as represented by a solid straight line L4 in FIG. 9.

A comparison unit 82 is configured to receive and compare the front/rear acceleration Gx, the velocity decrease amount Vx and the small overlap collision threshold. More specifically, the comparison unit 82 switches an output signal from a low level signal to a high level signal at a time point when the front/rear acceleration Gx corresponding to the velocity decrease amount Vx crosses the small overlap collision threshold from a lower side to an upper side for the first time (refer to a point PB of FIG. 9).

An AND circuit unit 83 is configured to receive the output signal from the comparison unit 82 and a small overlap collision determination result signal from the collision form determination unit 113. The small overlap collision determination result signal becomes a high level signal while the collision form determination unit 113 determines that the collision form is the small overlap collision (either one of the left side small overlap collision and the right side small overlap collision) by using the above-mentioned discrimination map A. Thus, the AND circuit unit 83 is configured to output a high level signal at a time point when the collision form is determined to be the small overlap collision, and when the front/rear acceleration Gx corresponding to the velocity decrease amount Vx crosses the small overlap collision threshold from the lower side to the upper side for the first time.

Figure 10:
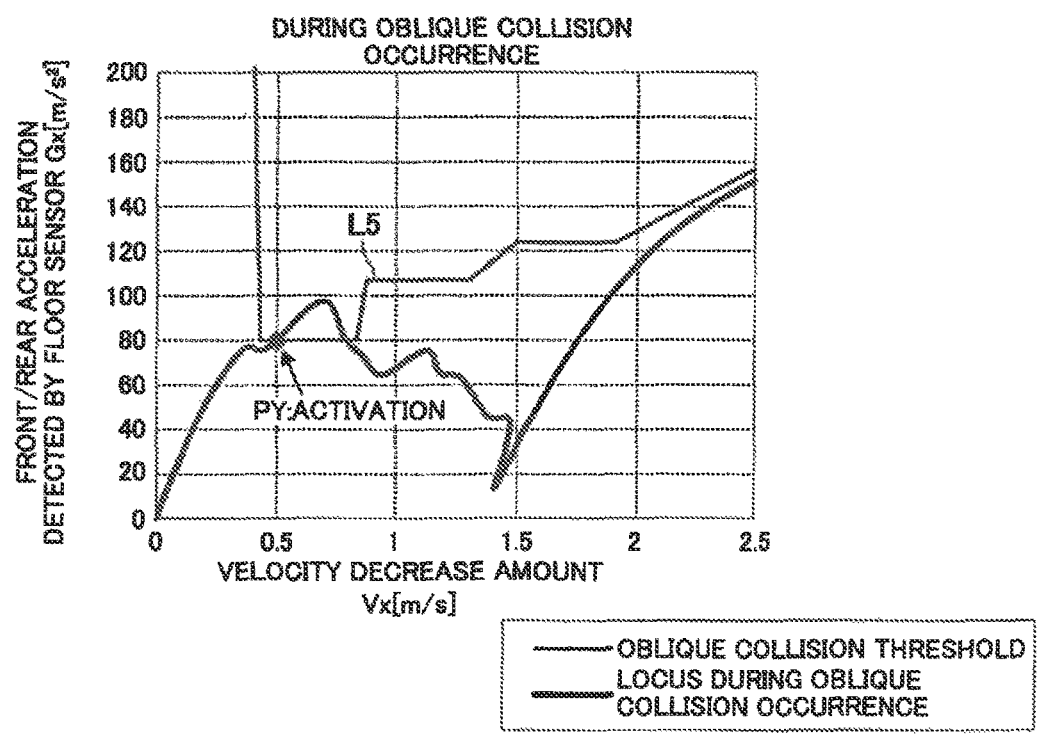
FIG. 10 is a graph for showing a relationship between the vehicle front/rear acceleration detected by the floor sensor when an oblique collision occurs and the velocity decrease amount calculated from the vehicle front/rear acceleration.

An oblique collision threshold generation unit 91 is configured to generate the "oblique collision threshold" that changes as represented by a solid straight line L5 in FIG. 10.

A comparison unit 92 is configured to receive and compare the front/rear acceleration Gx, the velocity decrease amount Vx and the oblique collision threshold. More specifically, the comparison unit 92 switches an output signal from a low level signal to a high level signal at a time point when the front/rear acceleration Gx corresponding to the velocity decrease amount Vx crosses the oblique collision threshold from a lower side to an upper side for the first time (refer to a point PY of FIG. 10).

An AND circuit unit 93 is configured to receive the output signal from the comparison unit 92 and an oblique collision determination result signal from the collision form determination unit 113. The oblique collision determination result signal becomes a high level signal while the collision form determination unit 113 determines that the collision form is the oblique collision (either one of the right side oblique collision and the left side oblique collision) by using the above-mentioned discrimination map A. Thus, the AND circuit unit 93 is configured to output a high level signal at a time point when the collision form is determined to be the oblique collision, and when the front/rear acceleration Gx corresponding to the velocity decrease amount Vx crosses the oblique collision threshold from the lower side to the upper side for the first time.

An OR circuit unit 100 is configured to receive the output signals from the AND circuit units 53, 63, 73, 83 and 93. Thus, when one of the output signals from the AND circuit units 53, 63, 73, 83 and 93 becomes the high level signal for the first time, the OR circuit unit 100 switches an output signal from a low level signal to a high level signal. This high level signal of the OR circuit unit 100 is the above-mentioned activation signal, and the above-mentioned occupant protection devices are activated based on this high level signal.

Meanwhile, a movement amount calculation unit 111 is configured to receive the widthwise direction acceleration GLy detected by the front left sensor 41, and calculate the left sensor movement amount SLy based on the widthwise direction acceleration GLy in accordance with following Equations (2) and (3) each time the predetermined period $\Delta$ts elapses.

In the Equation (2), VLy is a velocity of the front left sensor 41, and VLyold is the velocity VLy of the front left sensor 41 calculated the predetermined period $\Delta$ts before (namely, a previous value of the velocity VLy).

In the Equation (3), SLyold is a movement amount (left sensor movement amount) SLy of the front left sensor 41 calculated the predetermined period $\Delta$ts before (namely, a previous value of the left sensor movement amount SLy).

$$VLy=(1-B)\cdot VLy\text{old}+\Delta ts\cdot GLy \quad (2)$$

$$SLy=(1-B)\cdot SLy\text{old}+\Delta ts\cdot VLy \quad (3)$$

Note that B is a constant taking following values. A value of B is appropriately changed depending on vehicles.

When front/rear acceleration Gx$\leq$2 [G]: B=$2^{-4}$
When front/rear acceleration Gx>2 [G]: B=$2^{-9}$ As apparent from the Equations (2) and (3), the movement amount calculation unit 111 calculates second order integral of the widthwise direction acceleration GLy substantially with respect to time (time integration) to calculate the left sensor movement amount SLy. It should be noted that when Gx>2 [G], the collision is considered to have been progressing, and reliability of the widthwise direction acceleration GLy is thus decreased. Therefore, the value of B is set to be an extremely small value so that a velocity which is an integral of the widthwise direction acceleration GLy is relatively small.

Similarly, a movement amount calculation unit 112 is configured to receive the widthwise direction acceleration GRy detected by the front right sensor 42, and calculate the right sensor movement amount SRy based on the widthwise direction acceleration GRy in accordance with following Equations (4) and (5) each time the predetermined period $\Delta$ts elapses.

In the Equation (4), VRy is a velocity of the front right sensor 42, and VRyold is the velocity VRy of the front right sensor 42 calculated the predetermined period Δts before (namely, a previous value of the velocity VRy).

In the Equation (5), SRyold is a movement amount (right sensor movement amount) SRy of the front right sensor 42 calculated the predetermined period Δts before (namely, a previous value of the right sensor movement amount SRy).

The value of B is as described before.

$$VRy=(1-B)\cdot VRyold+\Delta ts\cdot GRy \quad (4)$$

$$SRy=(1-B)\cdot SRyold+\Delta ts\cdot VRy \quad (5)$$

As apparent from the Equations (4) and (5), the movement amount calculation unit 112 calculates second order integral of the widthwise direction acceleration GRy substantially with respect to time (time integration) to calculate the right sensor movement amount SRy. It should be noted that when Gx>2 [G], the collision is considered to have been progressing, and reliability of the widthwise direction acceleration GRy is thus decreased. Therefore, the value of B is set to be an extremely small value so that a velocity which is an integral of the widthwise direction acceleration GRy is relatively small.

The collision form determination unit 113 is configured to receive the left sensor movement amount SLy calculated by the movement amount calculation unit 111 and the right sensor movement amount SRy calculated by the movement amount calculation unit 112 each time the predetermined period Δts elapses, apply the left sensor movement amount SLy and the right sensor movement amount SRy to the discrimination map A illustrated in FIG. 4A and specify (identify, determine) the collision form based on the above-mentioned method. Then, the collision form determination unit 113 is configured to transmit the high level signal to the AND circuit unit 53 when a specified collision form is the head-on collision, and transmit the high level signal to the AND circuit unit 63 when a specified collision form is the pole collision. Further, the collision form determination unit 113 is configured to transmit the high level signal to the AND circuit unit 73 when a specified collision form is the offset collision, transmit the high level signal to the AND circuit unit 83 when a specified collision form is the small overlap collision, and transmit the high level signal to the AND circuit unit 93 when a specified collision form is the oblique collision. The above description is the overview of the activation control logic according to the first device.

As described above, the first device is configured to determine to which region that is set in the discrimination map A the point determined by the left sensor movement amount SLy and the right sensor movement amount SRy belongs, and determine that a collision whose collision form is corresponding to the region to which the point belongs is occurring (that is, specify the collision form). Then, the first device changes, in accordance with the specified collision form, based on which signal out of the output signals from the comparison units 52 to 92 the first device generates the activation signal. In other words, the first device is configured to practically switch among the activation conditions (in this case, among the respective collision determination thresholds) of the occupant protection devices in accordance with the specified collision form.

(Specific Operation)

A description is now given of a specific operation when the CPU of the ECU 45 conducts the collision determination. This operation realizes the above-mentioned function of the collision form determination unit 113.

Figure 11:
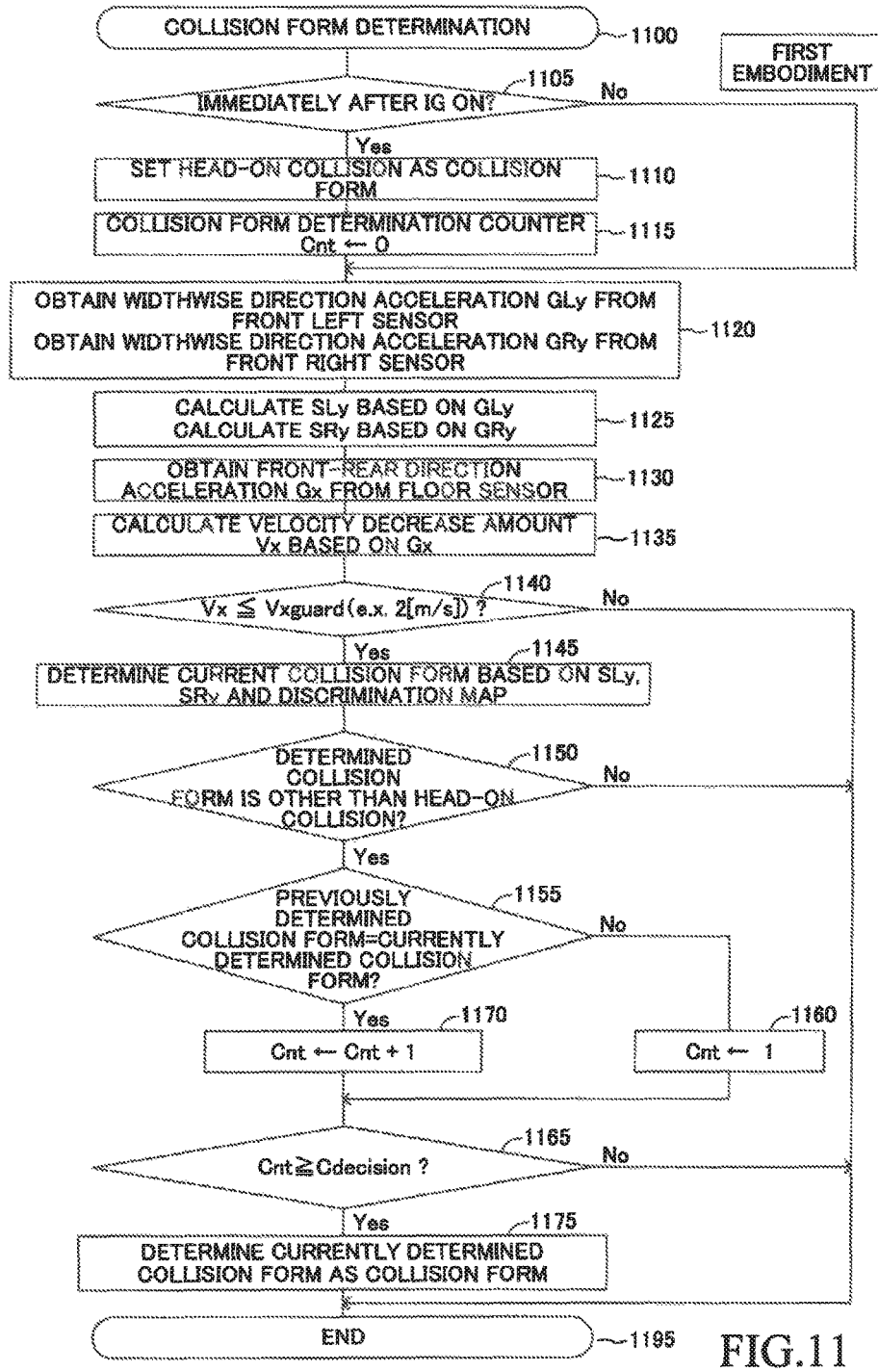
FIG. 11 is a flowchart for illustrating a routine executed by an ECU illustrated in FIG. 2.

The CPU is configured to execute a "collision form determination routine" illustrated as a flowchart in FIG. 11 each time the predetermined period Δts elapses. Thus, the CPU starts processings from Step 1100 of FIG. 11 at a predetermined timing, and proceeds to Step 1105 to determine whether or not the current time point is a time point immediately after an ignition key switch (not shown) of the vehicle 10 has been changed from an off position to an on position (hereinafter referred to as "time point immediately after IG ON").

When the current time point is the time point immediately after IG ON, the CPU makes a determination of "Yes" in Step 1105, and proceeds to Step 1110 to set (temporarily decide) the head-on collision as the collision form.

Next, the CPU proceeds to Step 1115 to set (clear) a value of a collision form determination counter (hereinafter referred to as "counter") Cnt to "0". Then, the CPU carries out processings from Step 1120 to Step 1135 in sequence (described later), and proceeds to Step 1140.

In contrast, when the time point at which the CPU carries out the processing in Step 1105 is not the time point immediately after IG ON, the CPU makes a determination of "No" in Step 1105, carries out the processings from Step 1120 to Step 1135 in sequence (described later), and proceeds to Step 1140.

Step 1120: The CPU obtains the widthwise direction acceleration GLy from the front left sensor 41 and the widthwise direction acceleration GRy from the front right sensor 42.

Step 1125: The CPU calculates the left sensor movement amount SLy in accordance with the aforementioned Equations (2) and (3) and calculates the right sensor movement amount SRy in accordance with the aforementioned Equations (4) and (5). This step corresponds to the "movement amount calculation unit 111 and movement amount calculation unit 112" illustrated in FIG. 5.

Step 1130: The CPU obtains the front-rear direction acceleration Gx from the floor sensor 43.

Step 1135: The CPU calculates the velocity decrease amount Vx in accordance with the aforementioned Equation (1). This step corresponds to the velocity decrease amount calculation unit 50 illustrated in FIG. 5.

Then, the CPU proceeds to Step 1140, and determines whether or not the velocity decrease amount Vx is equal to or less than a guard value (threshold) Vguard (e.g., 2 [m/s]), thereby determining if the collision has not progressed and if reliabilities of the front left sensor 41, the front right sensor 42 and the floor sensor 43 are not lost.

When the velocity decrease amount Vx is equal to or less than the guard value Vguard, the CPU makes a determination of "Yes" in Step 1140, and proceeds to Step 1145 to apply the left sensor movement amount SLy and the right sensor movement amount SRy to the discrimination map A illustrated in FIG. 4A, thereby determining (specifying, discriminating and identifying) the collision form based on the above-mentioned method.

Next, the CPU proceeds to Step 1150 to determine whether or not the collision form determined in Step 1145 (that is, the collision form determined for this time) is a collision form other than the head-on collision. At this time, when the collision form determined for this time is the head-on collision, the CPU makes a determination of "No" in Step 1150, and directly proceeds to Step 1195 to temporarily terminate the present routine. In this case, the head-on collision has been set as the collision form in the former Step 1110. Thus, the CPU decides that the collision form is the head-on collision. This determination corresponds to the state in which the collision form determination unit 113 illustrated in FIG. 5 transmits the high level signal to the AND circuit unit 53.

In contrast, when the collision form determined for this time is not the head-on collision, the CPU makes a determination of "Yes" in Step 1150, and proceeds to Step 1155 to determine whether or not the collision form determined by the processing in Step 1145 when this routine was carried out for the previous time (that is, the collision form determined for the previous time) and the collision form determined for this time are the same as each other.

When the collision form determined for the previous time and the collision form determined for this time are not the same as each other, the CPU makes a determination of "No" in Step 1155, and proceeds to Step 1160 to set the value of the counter Cnt to "1". Next, the CPU proceeds to Step 1165 to determine whether or not the value of the counter Cnt is equal to or more than a collision form decision threshold Cdecision. The collision form decision threshold Cdecision is set to an integer equal to or more than 2 (e.g., "3").

When the current time point is immediately after when the value of the counter Cnt is set to "1" by the processing in Step 1160, the CPU makes a determination of "No" in Step 1165, and directly proceeds to Step 1195 to temporarily terminate the present routine. Also in this case, the head-on collision has been set as the collision form in the former Step 1110. Thus, the CPU determines that the collision form is the head-on collision.

The CPU resumes the processings from Step 1100 each time the predetermined period Δts elapses. Thus, the determination processing of the collision form in Step 1145 is repeated. Therefore, when the collision progresses, the point decided by the left sensor movement amount SLy and the right sensor movement amount SRy remains in one of the "regions set in the discrimination map A illustrated in FIG. 4A" corresponding to the collision forms. In this case, the collision form determined for the previous time and the collision form determined for this time are the same as each other, and hence the CPU makes a determination of "Yes" in Step 1155, and proceeds to Step 1170 to increment the value of the counter Cnt by "1". Thus, as the collision progresses, the value of the counter Cnt gradually increases, and becomes equal to or more than the collision form decision threshold Cdecision at a certain time point.

When the value of the counter Cnt becomes equal to or more than the collision form decision threshold Cdecision, the CPU makes a determination of "Yes" in Step 1165, and proceeds to Step 1175 to decide the collision form determined for this time (that is, the collision form based on the determination in Step 1145 carried out immediately before) as a final collision form. Steps 1145 to 1175 correspond to the collision form determination unit 113 illustrated in FIG. 5 in this way. It should be noted that the state in which the value of the counter Cnt becomes equal to or more than the collision form decision threshold Cdecision is the same in meaning as a state in which it is determined that the point P (=(SLy,SRy)) has entered any region other than the head-on collision region out of the regions defined in advance for the respective collision forms of the discrimination map A.

When the finally decided collision form is the pole collision, the processing in Step 1175 corresponds to a processing where the "collision form determination unit 113 illustrated in FIG. 5 transmits the high level signal to the AND circuit unit 63". Similarly, when the finally decided collision form is the offset collision, the processing in Step 1175 corresponds to a processing where the collision form determination unit 113 transmits the high level signal to the AND circuit unit 73, when the finally decided collision form is the small overlap collision, the processing in Step 1175 corresponds to a processing where the collision form determination unit 113 transmits the high level signal to the AND circuit unit 83, and when the finally decided collision form is the oblique collision, the processing in Step 1175 corresponds to a processing where the collision form determination unit 113 transmits the high level signal to the AND circuit unit 93.

When the collision further progresses and enters a collision latter period, the velocity decrease amount Vx becomes more than the guard value Vguard. In this case, reliability of the floor sensor 43 and the like may be lost. Thus, when the velocity decrease amount Vx becomes more than the guard value Vguard, the CPU makes a determination of "No" in Step 1140, and directly proceeds to Step 1195. Thus, the collision form that has been decided until this time point is maintained as a final collision form.

It should be noted that the value of the collision form decision threshold Cdecision may be "1". In this case, when the collision form determined for the previous time and the collision form determined for this time are different from each other, the collision form determined for this time (that is, the collision form based on the determination for this time in Step 1145) is immediately decided as a final collision form.

As described above, the first device is configured to monitor in which "region defined in advance for each of the collision forms" of the discrimination map A the point (=(SLy, SRy)) exists, and discriminate (identify or specify) the form of the occurring collision as a "collision corresponding to the region in which the point P exists". Thus, the collision form (in particular, whether the collision form is the pole collision or the head-on collision) can reliably be distinguished. Further, the first device is configured to substantially change (set) the activation condition for the occupant protection devices in correspondence to the specified collision form. As a result, appropriate activation control can be carried out.

Second Embodiment

A description is now given of the present control device according to a second embodiment of the present invention (hereinafter also referred to as "second device"). The second device is different from the first device only in that the occupant protection devices to be activated are changed in correspondence to the determined collision form. A description is now given of this difference.

(Overview of Activation Control Logic)

Figure 12:
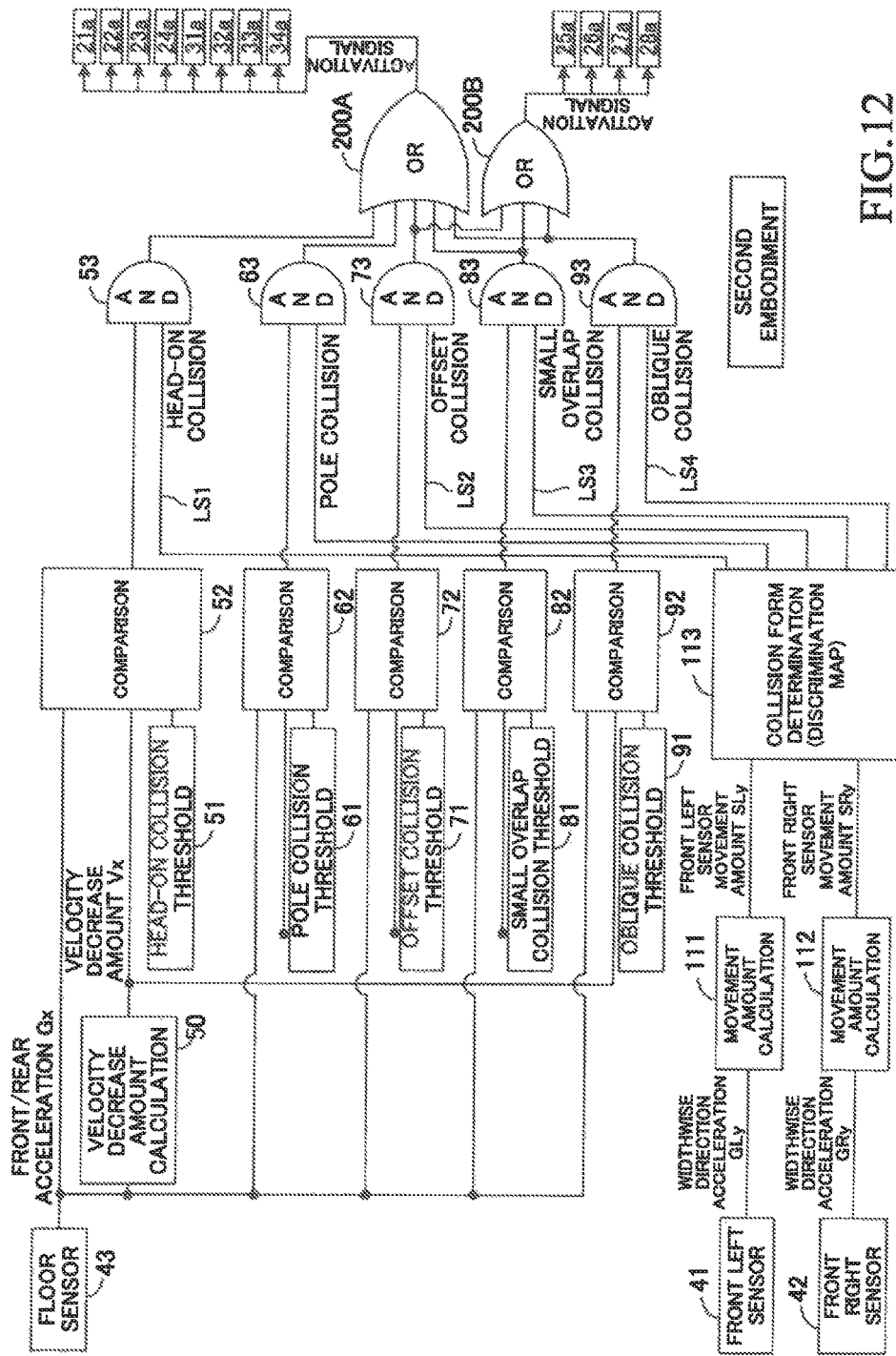
FIG. 12 is a functional block diagram for illustrating activation control logic of an activation control device for occupant protection devices according to a second embodiment of the present invention (second device).

As illustrated in FIG. 12, an activation control logic for the occupant protection devices according to the second device is different from the activation control logic according to the first device only in that the second device includes two OR circuit units 200A and 200B in place of the OR circuit unit 100 of the first device.

The OR circuit unit 200A is configured to receive the output signals from the AND circuit units 53, 63, 73, 83 and 93. Thus, when one of the output signals of the AND circuit units 53, 63, 73, 83 and 93 becomes the high level signal for the first time, the OR circuit unit 200A switches an output signal from a low level signal to a high level signal. Further, the output signal from the OR circuit unit 200A is transmitted to the inflators 21a to 24a and the inflators 31a to 34a. Thus, when the output signal from the OR circuit unit 200A is switched to the high level signal, the driver's seat airbag 21, the passenger's seat airbag 22, the driver's seat knee airbag 23, the passenger's seat knee airbag 24, the driver's seat seatbelt pretensioner 31, the passenger's seat seatbelt pretensioner 32, the rear right seat seatbelt pretensioner 33 and the rear left seat seatbelt pretensioner 34 are activated.

In contrast, the OR circuit unit 200B is configured to receive the output signals from the AND circuit units 73, 83 and 93. Thus, when one of the output signals from the AND circuit units 73, 83 and 93 becomes the high level signal for the first time, the OR circuit unit 200B switches an output signal from a low level signal to a high level signal. Further, the output signal from the OR circuit unit 200B is transmitted to the inflators 25a to 28a. Thus, when the output signal from the OR circuit unit 200B is switched to the high level signal, the driver's seat side airbag 25, the passenger's seat side airbag 26, the driver's-seat-side curtain airbag 27 and the passenger's-seat-side curtain airbag 28 are activated.

That is, with the second device, when a collision is determined to have occurred, regardless of whether the collision form is a head-on collision type (head-on collision or pole collision) or an oblique collision type (offset collision, small overlap collision or oblique collision), all the airbags other than the side airbags and the curtain airbags are activated (deployed), and all the pretensioners are activated.

Further, with the second device, while the side airbags and the curtain airbags are activated (deployed) when the collision form is the oblique collision type, none of the side airbags and the curtain airbags are activated (deployed) when the collision form is the head-on collision type. With the second device, the occupant protection devices to be activated can be changed in correspondence to the collision form in this way.

It should be noted that the occupant protection devices to be activated in correspondence to the collision form are not limited to the above-mentioned example. For example, when the ECU 45 is configured to identify the left side offset collision and the right side offset collision, which are the offset collisions and are thus one of the oblique collision types, the ECU 45 may be configured to deploy the passenger's seat (front left seat) side airbag 26 and the passenger's-seat-side (front left seat side) curtain airbag 28, but not to deploy the driver's seat (front right seat) side airbag 25 and the driver's-seat-side (front right seat side) curtain airbag 27 when the ECU 45 determines that the offset collision is the left side offset collision. Similarly, the ECU 45 may be configured to deploy the driver's seat (front right seat) side airbag 25 and the driver's-seat-side (front right seat side) curtain airbag 27, but not to deploy the passenger's seat (front left seat) side airbag 26 and the passenger's-seat-side (front left seat side) curtain airbag 28 when the ECU 45 determines that the offset collision is the right side offset collision.

With this configuration, unnecessary occupant protection devices are not activated, and hence a repair cost can be decreased when repair is necessary.

Third Embodiment

A description is now given of the present control device (hereinafter also referred to as "third device") according to a third embodiment of the present invention. The third device is different from the first device only in that the collision determination is carried out based on a comparison of magnitudes between the front/rear acceleration Gx and the collision determination threshold, and that the velocity decrease amount Vx is not used for the collision determination. A description is now given of this difference.

(Overview of Activation Control Logic of Third Device)

Figure 13:
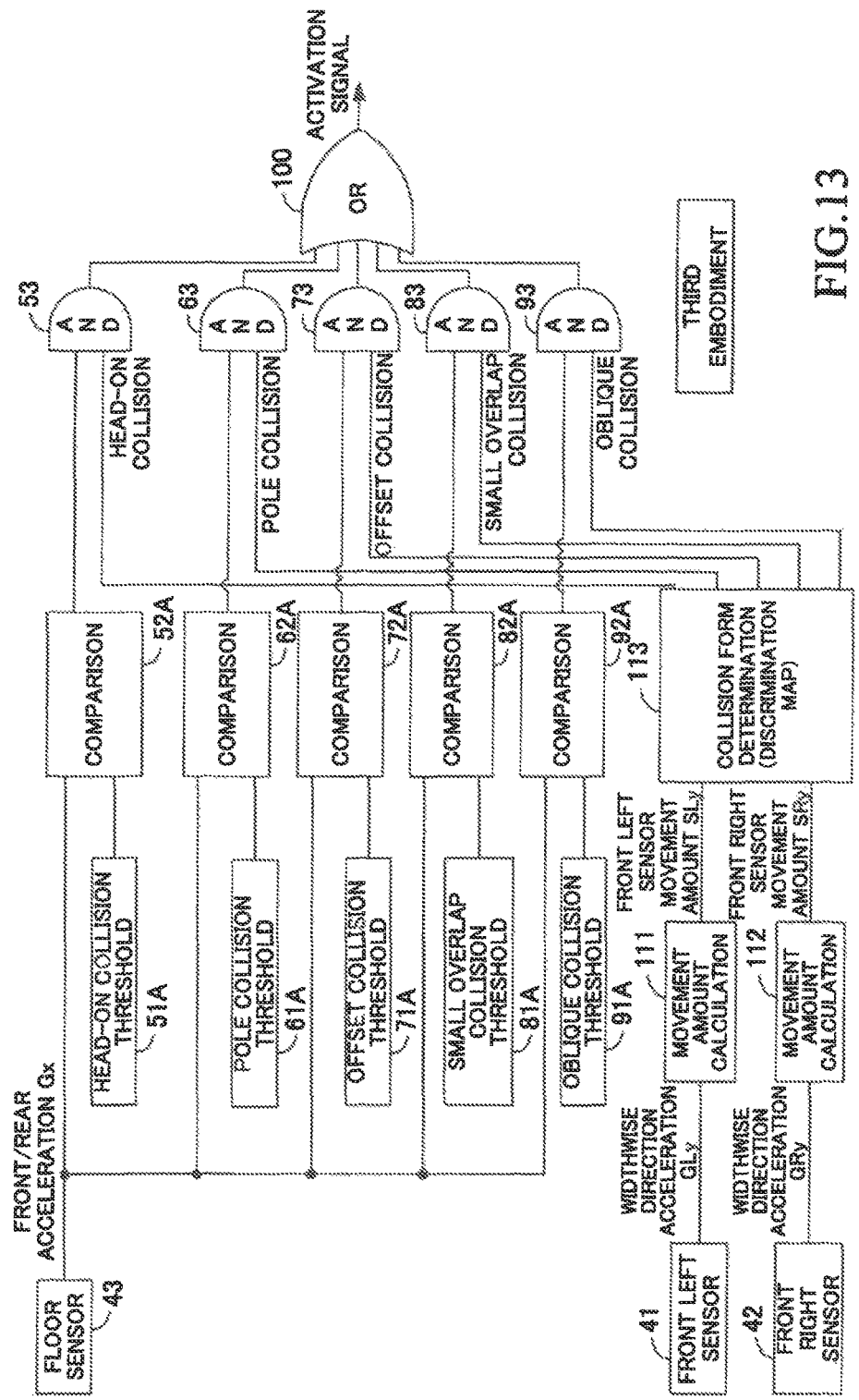
FIG. 13 is a functional block diagram for illustrating activation control logic of an activation control device for occupant protection devices according to a third embodiment of the present invention (third device).

As illustrated in FIG. 13, an activation control logic for the occupant protection devices according to the third device is different from the activation control logic according to the first device only in that the activation control logic according to the third device does not include the velocity decrease amount calculation unit 50 illustrated in FIG. 5, includes threshold generation units 51A, 61A, 71A, 81A and 91A respectively in place of the threshold generation units 51, 61, 71, 81 and 91 illustrated in FIG. 5, and includes comparison units 52A, 62A, 72A, 82A and 92A respectively in place of the comparison units 52, 62, 72, 82 and 92 illustrated in FIG. 5.

More specifically, the head-on collision threshold generation unit 51A is configured to generate a head-on collision threshold that is constant and defined in advance for a head-on collision determination, independently of any one of the time and the velocity decrease amount Vx. The comparison unit 52A is configured to compare the head-on collision threshold and the front/rear acceleration Gx with each other, and switch an output signal from a low level signal to a high level signal when the front/rear acceleration Gx becomes equal to or more than the head-on collision threshold.

The pole collision threshold generation unit 61A is configured to generate a pole collision threshold that is constant and defined in advance for a pole collision determination, independently of any one of the time and the velocity decrease amount Vx. The comparison unit 62A is configured to compare the pole collision threshold and the front/rear acceleration Gx with each other, and switch an output signal from a low level signal to a high level signal when the front/rear acceleration Gx becomes equal to or more than the pole collision threshold.

The offset collision threshold generation unit 71A is configured to generate an offset collision threshold that is constant and defined in advance for an offset collision determination, independently of any one of the time and the velocity decrease amount Vx. The comparison unit 72A is configured to compare the offset collision threshold and the front/rear acceleration Gx with each other, and switch an output signal from a low level signal to a high level signal when the front/rear acceleration Gx becomes equal to or more than the offset collision threshold.

The small overlap collision threshold generation unit 81A is configured to generate a small overlap collision threshold that is constant and defined in advance for a small overlap collision determination, independently of any one of the time and the velocity decrease amount Vx. The comparison unit 82A is configured to compare the small overlap collision threshold and the front/rear acceleration Gx with each other, and switch an output signal from a low level signal to a high level signal when the front/rear acceleration Gx becomes equal to or more than the small overlap collision threshold.

The oblique collision threshold generation unit 91A is configured to generate an oblique collision threshold that is constant and defined in advance for an oblique collision determination, independently of any one of the time and the velocity decrease amount Vx. The comparison unit 92A is configured to compare the oblique collision threshold and the front/rear acceleration Gx with each other, and switch an output signal from a low level signal to a high level signal when the front/rear acceleration Gx becomes equal to or more than the oblique collision threshold.

Thus, with the third device, the occupant protection devices are activated when the front/rear acceleration Gx exceeds the collision determination threshold defined for the determined collision form (any one of the head-on collision threshold, the pole collision threshold, the offset collision threshold, the small overlap collision threshold and the oblique collision threshold) for the first time.

(Actions/Effects of Third Device)

The prior-art device was configured to discriminate the collision form based on the front/rear acceleration GLx detected by the front left sensor 41 and the front/rear acceleration GRx detected by the front right sensor 42. However, there was a case where the head-on collision and the pole collision had similar "front/rear accelerations GLx and front/rear accelerations GRx", and hence the head-on collision and the pole collision could not be precisely distinguished from each other.

Figure 14:
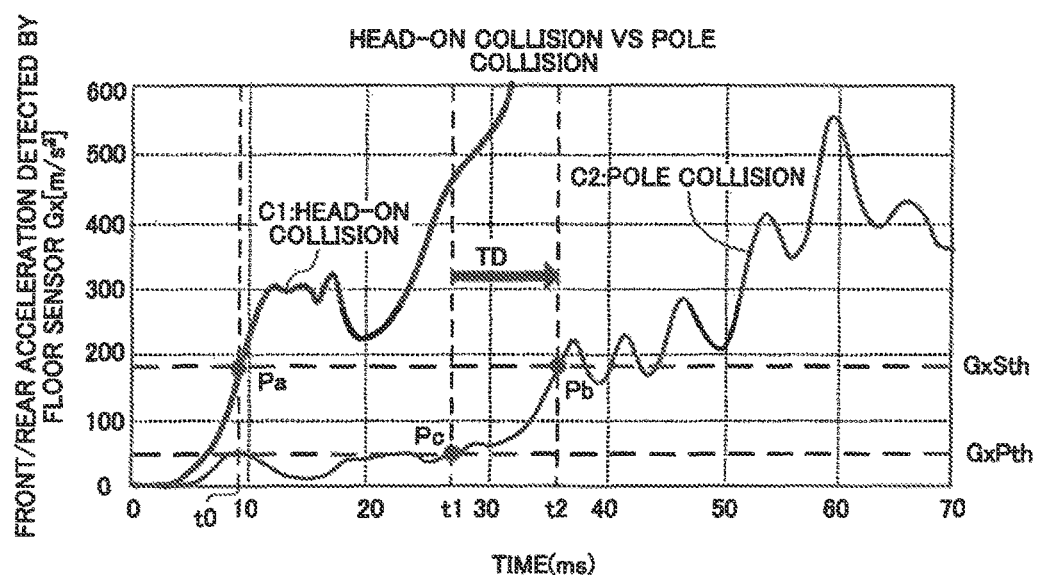
FIG. 14 is a graph for showing temporal transitions of the "vehicle front/rear acceleration detected by the floor sensor" when the head-on collision and the pole collision occur.

Therefore, as shown in FIG. 14, the prior-art device was configured to set the collision determination threshold, for example, to "an acceleration GxSth which the floor acceleration Gx reaches at a time point at which the occupant protection devices need to be activated when the head-on collision occurs". In this case, when the collision form is the head-on collision, the floor acceleration Gx exceeds the acceleration GxSth at a timing t0 corresponding to a point Pa of FIG. 14, and hence the occupant protection devices can be activated at the timing t0. In contrast, when the collision form is the pole collision, the floor acceleration Gx exceeds the acceleration GxSth at a timing t2 corresponding to a point Pb of FIG. 14, and hence the occupant protection devices are activated at the timing t2. However, when the collision form is the pole collision, the occupant protection devices actually need to be activated at a timing t1 that is earlier than the timing t2. In other words, the prior-art device had such a problem that, when the collision form is the pole collision, the activation timing for the occupant protection devices is delayed by a period TD.

In contrast, the third device, as with the first and second devices, is configured to determine whether or not the collision form is the pole collision based on the left sensor movement amount SLy calculated based on the widthwise direction acceleration GLy detected by the front left sensor 41, the right sensor movement amount SRy calculated based on the widthwise direction acceleration GRy detected by the front right sensor 42 and the discrimination map A, and when the collision form is determined to be the pole collision, the third device is configured to substantially change the collision determination threshold from the head-on collision threshold GxSth to a pole collision threshold GxPth. Thus, the problem that the activation timing for the occupant protection devices is delayed when the collision form is the pole collision can be avoided. A description is now given of this point.

Figure 15A:
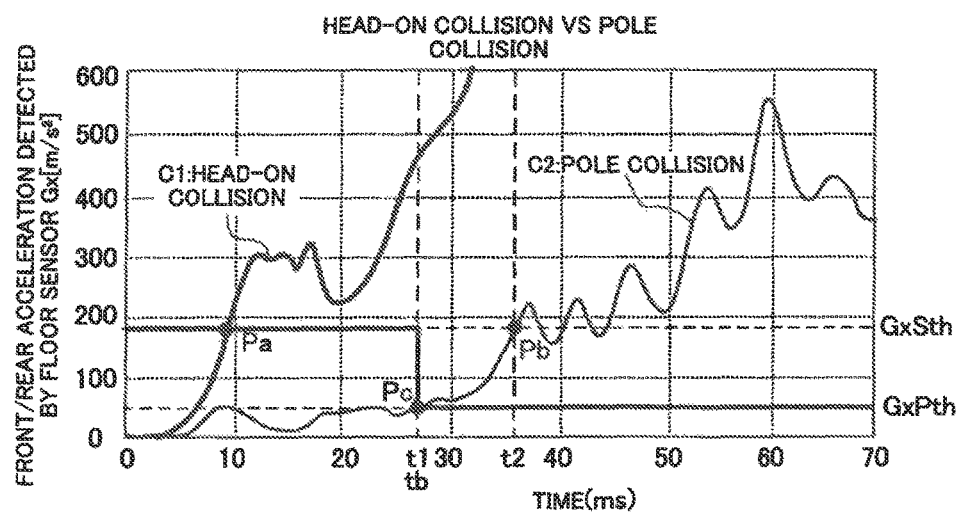
FIG. 15A is a graph for showing temporal transitions of the "vehicle front/rear acceleration detected by the floor sensor" when the head-on collision and the pole collision occur.
Figure 15B:
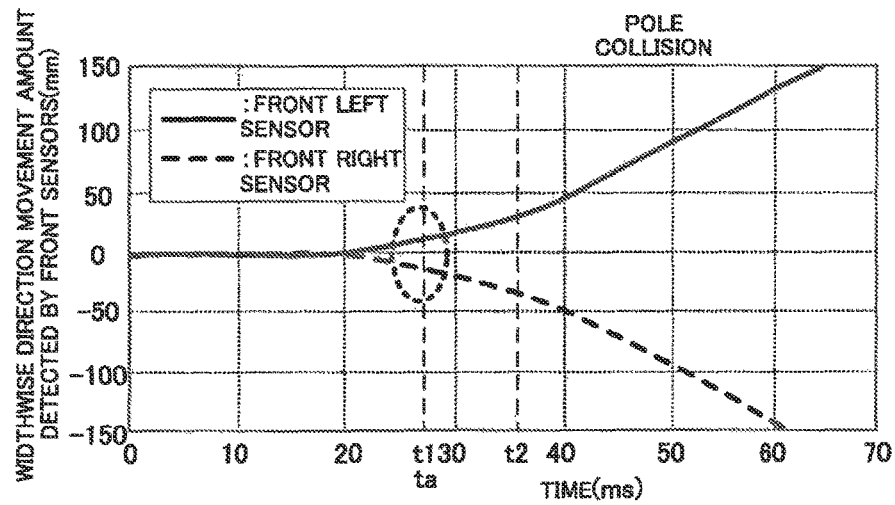
FIG. 15B is a graph for showing temporal transitions of "vehicle widthwise direction movement amounts calculated based on vehicle widthwise direction accelerations detected by the front left sensor and the front right sensor when the pole collision occurs".

FIG. 15B is a graph for showing a state of changes in the left sensor movement amount SLy and the right sensor movement amount SRy when the pole collision has occurred. Note that movement toward the right direction is represented as a positive value in this graph.

As appreciated from the graph of FIG. 15B, the left sensor movement amount SLy and the right sensor movement amount SRy increase by amounts approximately equal to each other (refer to an inside of an ellipsoid in a broken line) at the timing t1 at which the occupant protection devices are desirably activated when the pole collision has occurred. Thus, as shown in FIG. 15A, a value effective as the "collision determination threshold to be compared with the floor acceleration Gx" can be switched from the "acceleration GxSth for the head-on collision determination" to the "acceleration GxPth for the pole collision determination" at the timing t1. Thus, the third device can activate the occupant protection devices at or immediately after the timing t1 corresponding to a point Pc when the pole collision has occurred.

Figure 16:
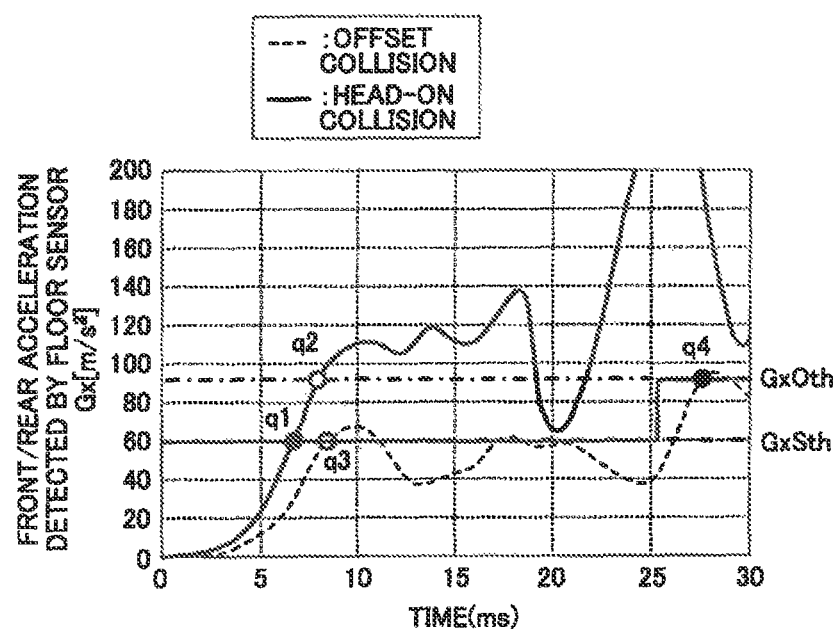
FIG. 16 is a graph for showing temporal transitions of the "vehicle front/rear acceleration detected by the floor sensor" when the head-on collision and the offset collision occur.

FIG. 16 is a graph for showing the floor acceleration Gx when the head-on collision has occurred and the floor acceleration Gx when the offset collision has occurred. According to experiments, the occupant protection devices need to be activated at a timing corresponding to a point q1 when the head-on collision has occurred, and the occupant protection devices need to be activated at a timing corresponding to a point q4 when the offset collision has occurred. However, when the acceleration GxSth for the head-on collision determination is set as the collision determination threshold, the occupant protection devices are activated at a timing corresponding to a point q3 that is too early compared to a timing corresponding to the point q4 when the offset collision has occurred. In contrast, when an acceleration GxOth for the offset collision determination is set as the collision determination threshold, the occupant protection devices are activated at the timing corresponding to the point q4 when the offset collision has occurred, but the occupant protection devices are activated at a timing corresponding to a point q2 that is later than the timing corresponding to the point q1 when the head-on collision has occurred.

However, the third device, as with the first and second devices, is configured to determine the collision form based on the left sensor movement amount SLy, the right sensor movement amount SRy and the discrimination map A, and can thus switch the value effective as the collision determination threshold from the "acceleration GxSth for the head-on collision determination" to the "acceleration GxOth for the offset collision determination". It should be noted that a timing at which the third device switches the collision determination threshold based on the determination of the collision form is a timing later than the timing corresponding to the point q1 and earlier than the timing corresponding to the point q4. Thus, the third device can activate the occupant protection devices at the timing corresponding to the point q1 when the head-on collision has occurred, and can activate the occupant protection devices at the timing corresponding to the point q4 when the offset collision has occurred.

Fourth Embodiment

A description is now given of the present control device (hereinafter also referred to as "fourth device") according to a fourth embodiment of the present invention. The fourth device is different from the third device only in that, when the collision form is the pole collision, the occupant protection devices are activated at a time point at which the collision form is determined to be the pole collision without performing the comparison of the magnitudes between the front/rear acceleration Gx and the collision determination threshold. A description is now given of this difference.

(Overview of Activation Control Logic of Fourth Device)

Figure 17:
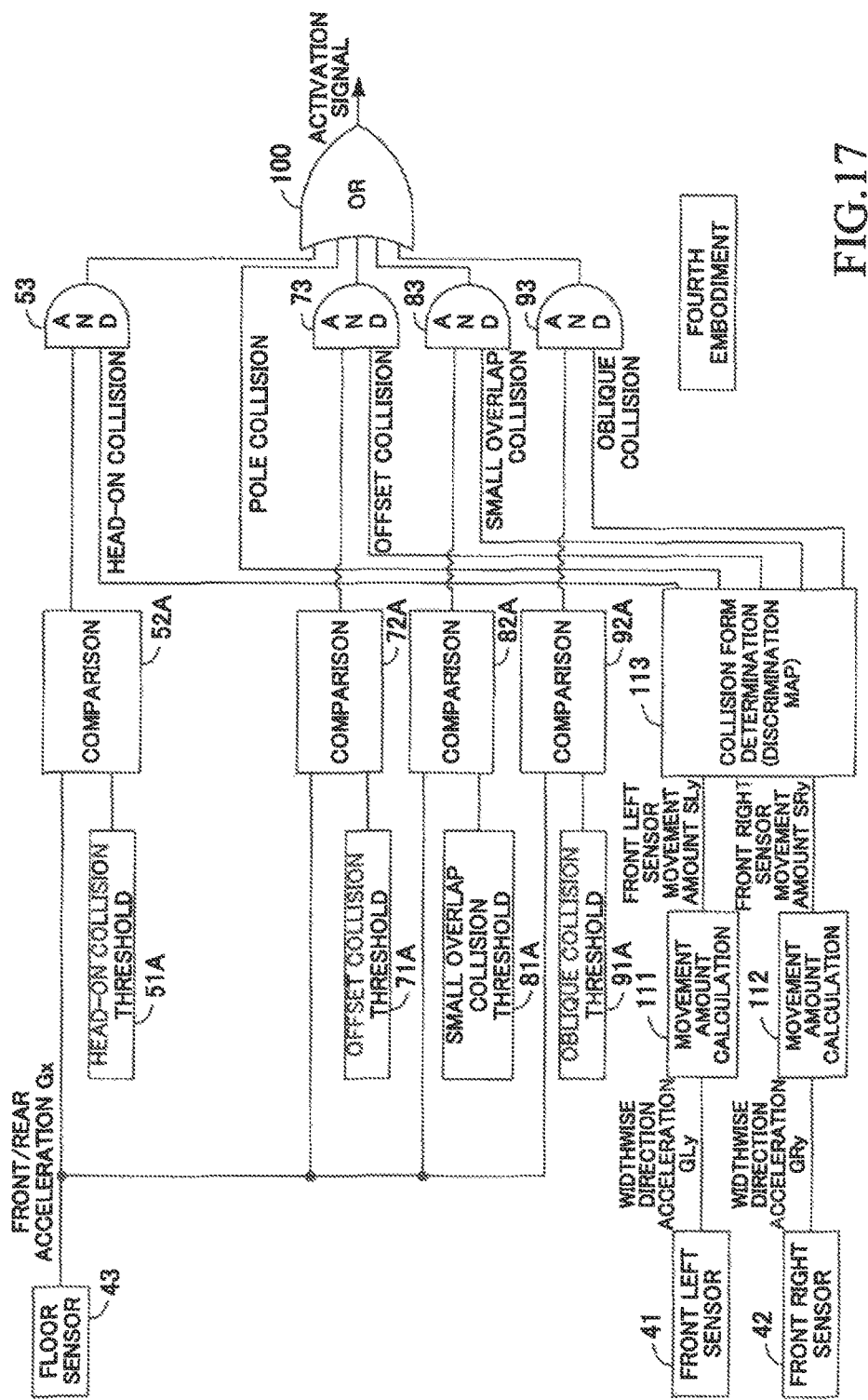
FIG. 17 is a functional block diagram for illustrating activation control logic of an activation control device for occupant protection devices according to a fourth embodiment of the present invention (fourth device).

As illustrated in FIG. 17, an activation control logic for the occupant protection devices according to the fourth device is different from the activation control logic according to the third device only in that the "pole collision threshold generation unit 61A and comparison unit 62A" are omitted from the control logic of the third device illustrated in FIG. 13, and that the pole collision determination result signal from the collision form determination unit 113 is directly input to the OR circuit unit 100.

As shown in FIG. 15A and FIG. 15B, the timing to at which the collision form can be determined to be the pole collision by the collision form determination unit 113 (a timing at which the pole collision determination result signal is switched from the low level signal to the high level signal) is extremely close to the timing tb at which the front/rear acceleration Gx crosses the "acceleration GxPth for the pole collision determination" from a lower side to an upper side for the first time. Thus, the fourth device is configured to determine that the pole collision has occurred to activate the occupant protection devices at a timing at which the collision form determination unit 113 determines that the collision form is the pole collision without comparing the front/rear acceleration Gx and the "acceleration GxPth for the pole collision determination" with each other.

Fifth Embodiment

A description is now given of the present control device (hereinafter also referred to as "fifth device") according to a fifth embodiment of the present invention. The fifth device is different from the first to fourth devices only in that the "widthwise direction acceleration GLy and the front/rear acceleration GLx" detected by the front left sensor 41 and the "widthwise direction acceleration GRy and the front/rear acceleration GRx" detected by the front right sensor 42 are used to discriminate the collision form out of the offset collision, the small overlap collision, the oblique collision, an oblique side collision, and a side collision in addition to the collision form discrimination for the respective first to fourth devices (a discrimination of the collision form by means of the discrimination map A). A description is now given of this difference.

The ECU 45 of the fifth device is configured to substantially calculate second-order integral of (configured to add up) the "widthwise direction acceleration GLy and the front/rear acceleration GLx" detected by the front left sensor 41 with respect to the time t, thereby respectively calculating the "widthwise direction movement amount SLy and a front/rear movement amount SLx" of the vehicle body portion to which the front left sensor 41 is mounted. Similarly, the ECU 45 of the fifth device is configured to substantially calculate second-order integral of (configured to add up) the "widthwise direction acceleration GRy and the front/rear acceleration GRx" detected by the front right sensor 42 with respect to the time t, thereby respectively calculating the "widthwise direction movement amount SRy and a front/rear movement amount SRx" of the vehicle body portion to which the front right sensor 42 is mounted.

Incidentally, when any one of the offset collision, the small overlap collision, the oblique collision, the oblique side collision, and the side collision has occurred, a neighboring portion of any one of the front left sensor 41 and the front right sensor 42 collides with a barrier. A sensor on the side on which the neighboring portion of one of the front left sensor 41 and the front right sensor 42 collides with the barrier is referred to as a collision side sensor, and a sensor on the side on which the neighboring portion of one of the front left sensor 41 and the front right sensor 42 does not collide with the barrier is referred to as a counter collision side sensor.

Figure 18:
FIG. 18 is a table for showing a relationship between a collision form and a locus of a point determined by "a vehicle widthwise direction movement amount and a vehicle front-rear direction movement amount" of the front sensor.

FIG. 18 is a table for showing respective relationships between the collision form and a locus of a point determined by the "widthwise direction movement amount and the front/rear movement amount" of the collision side sensor. A description is now given of each of the collision forms. It should be noted that a "discrimination map B" of FIG. 18 is a graph where a horizontal axis (X axis) represents the front/rear movement amount of the collision side sensor and a vertical axis (Y axis) represents the widthwise direction movement amount of the collision side sensor. The discrimination map B is also stored in the ROM. Further, "waveform in discrimination map B" of FIG. 18 is a locus drawn by a point R (=(front/rear movement amount, widthwise direction movement amount)) determined by the front/rear movement amount of the collision side sensor and the widthwise direction movement amount of the collision side sensor as the time t elapses.

<Offset Collision>

When the collision form is the offset collision, the collision side sensor greatly moves backward of the vehicle, and slightly moves toward the inside direction of the vehicle. Thus, after occurrence of the offset collision, the locus of the point R draws a waveform substantially along the horizontal axis as represented by a solid line in (C1) of FIG. 18. Further, the point R departs from the origin as time elapses.

<Small Overlap Collision>

When the collision form is the small overlap collision, the collision side sensor greatly moves backward of the vehicle, and moves by a medium amount toward the inside direction of the vehicle. Thus, after occurrence of the small overlap collision, the locus of the point R draws a waveform in which the widthwise direction movement amount increases as the front/rear movement amount increases, as represented by a solid line in (D1) of FIG. 18. A magnitude of an average of a gradient of the waveform is more than a magnitude of an average of a gradient of the waveform after the occurrence of the offset collision. Further, the point R departs from the origin as time elapses.

<Oblique Collision>

When the collision form is the oblique collision, the collision side sensor greatly moves backward of the vehicle, and also greatly moves in the vehicle inside direction. Thus, after occurrence of the oblique collision, the locus of the point R draws a waveform in which the widthwise direction movement amount increases as the front/rear movement amount increases, as represented by a solid line in (E1) of FIG. 18. A magnitude of an average of a gradient of the waveform is more than the magnitude of the average of the gradient of the waveform after the occurrence of the small overlap collision. Further, the point R departs from the origin as time elapses.

<Oblique Side Collision>

When the collision form is the oblique side collision (a collision in a direction between the side collision which is a collision in the widthwise direction of the vehicle, and the oblique collision), the collision side sensor slightly moves backward of the vehicle, and greatly moves in the vehicle inside direction. Thus, after occurrence of the oblique side collision, the locus of the point R draws a waveform in which the widthwise direction movement amount increases as the front/rear movement amount increases, as represented by a solid line in (F1) of FIG. 18. A magnitude of an average of a gradient of the waveform is more than the magnitude of the average of the gradient of the waveform after the occurrence of the oblique collision. Further, the point R departs from the origin as time elapses.

<Side Collision>

When the collision form is the side collision (collision in the widthwise direction of the vehicle), the collision side sensor moves extremely slightly or does not move backward of the vehicle, and moves greatly in the vehicle inside direction. Thus, after occurrence of the side collision, the locus of the point R draws a waveform substantially along the vertical axis as represented by a solid line in (G1) of FIG. 18. Further, the point R departs from the origin as time elapses.

Figure 19:
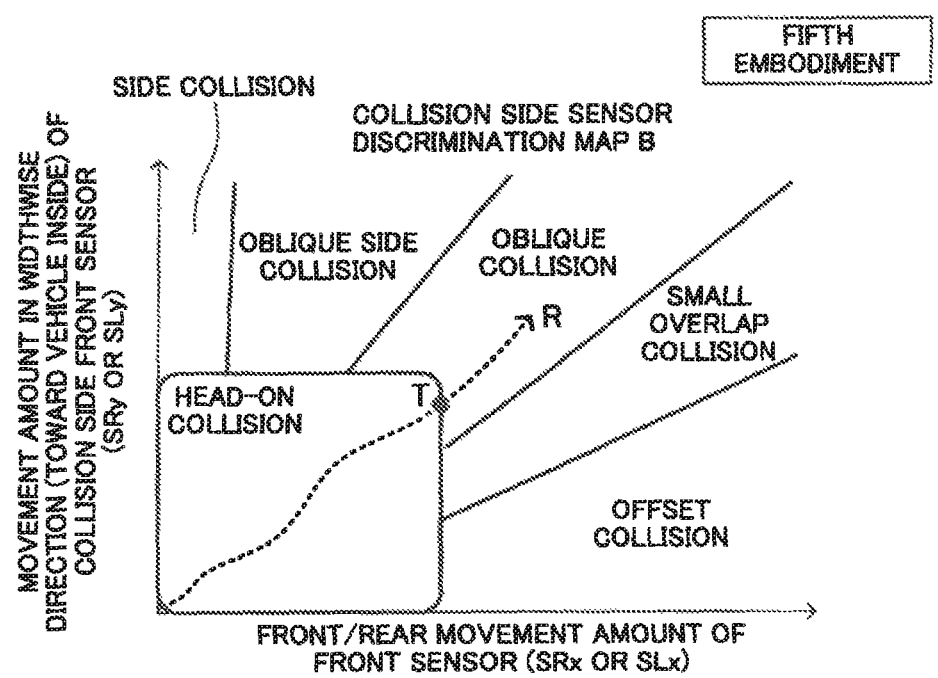
FIG. 19 is a map to which a CPU of an activation control device for occupant protection devices according to a fifth embodiment of the present invention (fifth device) refers when the CPU discriminates the collision form.

As described above, the locus of the point R draws the waveform specific to each of the collision forms. The fifth device is configured to identify the collision form based on this viewpoint. That is, a "discrimination map B (collision form identification map)" illustrated in FIG. 19 is generated in advance, and the discrimination map B is stored in the ROM of the ECU 45. This discrimination map B is a map having the same axes as those of the discrimination map B of FIG. 18, and regions corresponding to the collision forms are set in advance in the discrimination map B.

The ECU 45 is configured to monitor in which region of the discrimination map B the point R=(front/rear movement amount of the collision side sensor, widthwise direction movement amount of the collision side sensor) exists, and determine that the collision form is a "collision corresponding to the region in which the point R exists".

For example, when the point R moves as illustrated by a broken line in FIG. 19, the point R initially exists in a head-on collision region, and hence the ECU 45 determines that the head-on collision is occurring. Then, when the point R is subsequently determined to have entered an oblique collision region (that is, determined to have passed through a point T), the ECU 45 determines that the oblique collision has occurred. That is, the ECU 45 specifies the collision form as the oblique collision.

(Overview of Activation Control Logic)

Figure 20:
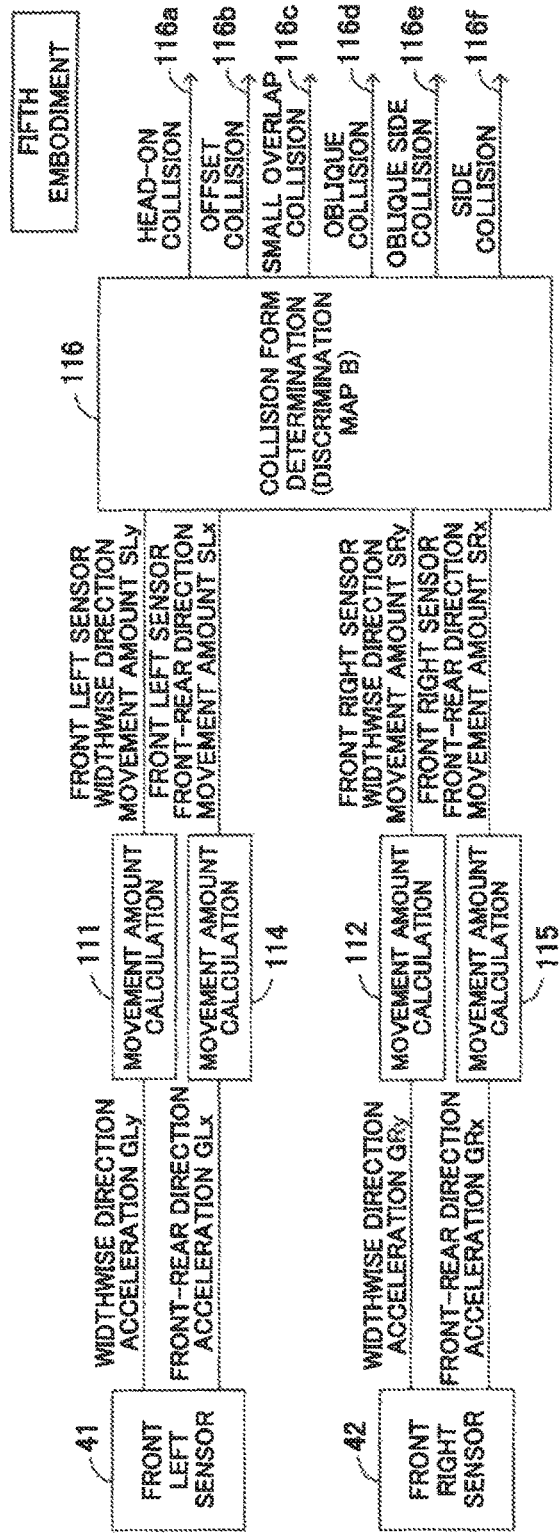
FIG. 20 is a functional block diagram for illustrating a part of activation control logic of the fifth device.
Figure 21:
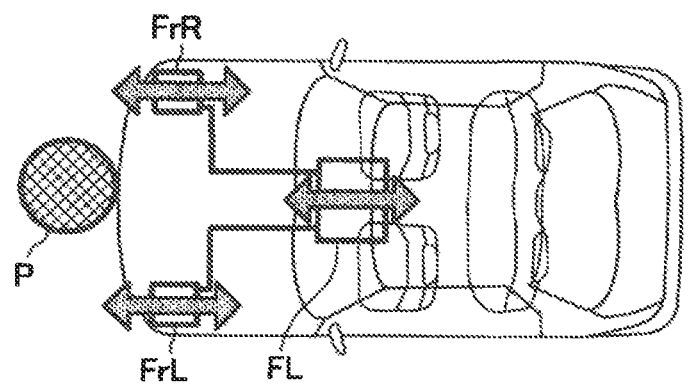
FIG. 21 is a schematic plan view of a vehicle for illustrating an arrangement of acceleration sensors of a prior-art device and detection directions of accelerations.

Referring to FIG. 20, a description is now given of a collision form determination logic out of the activation control for the occupant protection devices according to the fifth device. Respective functional blocks illustrated in FIG. 20 are actually realized by the CPU of the ECU 45 executing the programs.

As described before, the movement amount calculation unit 111 is configured to receive the widthwise direction acceleration GLy detected by the front left sensor 41, and calculate the left sensor movement amount SLy based on the widthwise direction acceleration GLy in accordance with the aforementioned Equations (2) and (3) each time the predetermined period Δts elapses.

As described above, the movement amount calculation unit 112 is configured to receive the widthwise direction acceleration GRy detected by the front right sensor 42, and calculate the right sensor movement amount SRy based on the widthwise direction acceleration GRy in accordance with the aforementioned Equations (4) and (5) each time the predetermined period Δts elapses.

A movement amount calculation unit 114 is configured to receive the front-rear direction acceleration GLx detected by the front left sensor 41, and calculate the front left sensor front/rear movement amount SLx based on the front-rear direction acceleration GLx in accordance with following Equations (6) and (7) each time the predetermined period Δts elapses.

In the Equation (6), VLx is a velocity of the front left sensor 41, VLxold is the velocity VLx of the front left sensor 41 calculated the predetermined period Δts before (namely, a previous value of the velocity VLx).

In the Equation (7), SLxold is the front/rear movement amount SLx of the front left sensor 41 calculated the predetermined period Δts before (namely, a previous value of the front/rear movement amount SLx).

The value of B is as described before.

$$VLx = (1-B) \cdot VLxold + \Delta ts \cdot GLx \quad (6)$$

$$SLx = (1-B) \cdot SLxold + \Delta ts \cdot VLx \quad (7)$$

As apparent from the Equations (6) and (7), the movement amount calculation unit 114 calculates second order integral of the front-rear direction acceleration GLx substantially with respect to time (time integration) to calculate the front/rear movement amount SLx.

Similarly, the movement amount calculation unit 115 is configured to receive the front-rear direction acceleration GRx detected by the front right sensor 42, and calculate the front right sensor front/rear movement amount SRx based on the front-rear direction acceleration GRx in accordance with following Equations (8) and (9) each time the predetermined period Δts elapses.

In the Equation (8), VRx is a velocity of the front right sensor 42, VRxold is the velocity VRx of the front right sensor 42 calculated the predetermined period Δts before (namely, a previous value of the velocity VRx).

In the Equation (9), SRxold is the front/rear movement amount SRx of the front right sensor 42 calculated the predetermined period Δts before (namely, a previous value of the front/rear movement amount SRx).

The value of B is as described before.

$$VRx = (1-B) \cdot VRxold + \Delta ts \cdot GRx \quad (8)$$

$$SRx = (1-B) \cdot SRxold + \Delta ts \cdot VRx \quad (9)$$

As apparent from the Equations (8) and (9), a movement amount calculation unit 115 calculates second order integral of the front-rear direction acceleration GRx substantially with respect to time (time integration) to calculate the front/rear movement amount SRx.

A collision form determination unit 116 is configured to receive the front left sensor widthwise direction movement amount SLy calculated by the movement amount calculation unit 111 and the front left sensor front/rear movement amount SLx calculated by the movement amount calculation unit 114. Further, the collision form determination unit 116 is configured to receive the front right sensor widthwise direction movement amount SRy calculated by the movement amount calculation unit 112 and the front right sensor front/rear movement amount SRx calculated by the movement amount calculation unit 115.

The collision form determination unit 116 is configured to compare the front left sensor widthwise direction movement amount SLy and the front right sensor widthwise direction movement amount SRy with each other, thereby determining that a sensor presenting a larger movement amount is the collision side sensor. Further, the collision form determination unit 116 applies the "widthwise direction movement amount and the front/rear movement amount" of the collision side sensor to the discrimination map B illustrated in FIG. 19, to thereby identify the collision form based on the above-mentioned method.

In addition, the collision form determination unit 116 is configured to output a high level signal via a line 116a used for outputting a state in which the head-on collision has occurred when the determined collision form is the head-on collision. The line 116a is connected to one input terminal of a two-input OR circuit unit (not shown). Further, a line LS1 of the collision form determination unit 113 illustrated in FIG. 12, which is used to output a state in which the head-on collision has occurred, is connected to the other input terminal of the OR circuit unit. An output line of the OR circuit unit is connected to an input terminal of the AND circuit unit 53 of FIG. 12 in place of the line LS1 connected to the AND circuit unit 53.

The collision form determination unit 116 is configured to output a high level signal via a line 116b used for outputting a state in which the offset collision has occurred when the determined collision form is the offset collision. The line 116b is connected to one input terminal of a two-input OR circuit unit (not shown). Further, a line LS2 of the collision form determination unit 113 illustrated in FIG. 12, which is used to output a state in which the offset collision has occurred, is connected to the other input terminal of the OR circuit unit. An output line of the OR circuit unit is connected to an input terminal of the AND circuit unit 73 of FIG. 12 in place of the line LS2 connected to the AND circuit unit 73.

The collision form determination unit 116 is configured to output a high level signal via a line 116c used for outputting a state in which the small overlap collision has occurred when the determined collision form is the small overlap collision. The line 116c is connected to one input terminal of a two-input OR circuit unit (not shown). Further, a line LS3 of the collision form determination unit 113 illustrated in FIG. 12, which is used to output a state in which the small overlap collision has occurred, is connected to the other input terminal of the OR circuit unit. An output line of the OR circuit unit is connected to an input terminal of the AND circuit unit 83 of FIG. 12 in place of the line LS3 connected to the AND circuit unit 83.

The collision form determination unit 116 is configured to output a high level signal via a line 116d used for outputting a state in which the oblique collision has occurred when the determined collision form is the oblique collision. The line 116d is connected to one input terminal of a two-input OR circuit unit (not shown). Further, a line LS4 of the collision form determination unit 113 illustrated in FIG. 12, which is used to output a state in which the oblique collision has occurred, is connected to the other input terminal of the OR circuit unit. An output line of the OR circuit unit is connected to an input terminal of the AND circuit unit 93 of FIG. 12 in place of the line LS4 connected to the AND circuit unit 93.

The collision form determination unit 116 is configured to output a high level signal via a line 116e used for outputting a state in which the oblique side collision has occurred when the determined collision form is the oblique side collision. This line 116e is directly connected to an input of the OR circuit unit 200B illustrated in FIG. 12.

The collision form determination unit 116 is configured to output a high level signal via a line 116f used for outputting a state in which the side collision has occurred when the determined collision form is the side collision. This line 116f is directly connected to an input of the OR circuit unit 200B illustrated in FIG. 12.

As described above, the fifth device can discriminate the collision form by using the "widthwise direction acceleration GLy and front/rear acceleration GLx" and the "widthwise acceleration GRy and front/rear acceleration GRx".

As described above, the present control device can specify the collision form by using the "left sensor movement amount SLy and right sensor movement amount SRy" calculated based on the widthwise direction acceleration GLy and the widthwise direction acceleration GRy. Thus, the collision form can be more precisely discriminated, and hence the occupant protection devices can be activated at the appropriate timings.

The present invention is not limited to the embodiments described above, and various variations can be adopted within the scope of the present invention. For example, the present control device may employ a discrimination method for the collision form employed by a prior-art activation control device in addition to the discrimination methods for the collision form according to the above-mentioned respective embodiments.

What is claimed is:

1. An activation control device for at least one occupant protection device, the activation control device being applicable to a vehicle including the at least one occupant protection device and at least one activation device configured to activate the at least one occupant protection device, the activation control device comprising:
   a front left sensor fixed to a front left side portion of the vehicle;
   a front right sensor fixed to a front right side portion of the vehicle; and
   an activation control unit configured to determine whether or not a predetermined activation condition is satisfied, and use the at least one activation device to activate the at least one occupant protection device when it is determined that the predetermined activation condition is satisfied, wherein:
   the front left sensor is configured to detect a first lateral acceleration, which is an acceleration in a vehicle widthwise direction of the front left sensor;
   the front right sensor is configured to detect a second lateral acceleration, which is an acceleration in the vehicle widthwise direction of the front right sensor; and
   the activation control unit is configured to:
      calculate a first movement amount representing a movement amount in the vehicle widthwise direction of the front left sensor based on the first lateral acceleration;
      calculate a second movement amount representing a movement amount in the vehicle widthwise direction of the front right sensor based on the second lateral acceleration;
      determine to which region out of regions each defined in advance for each collision form a point defined by the first movement amount and the second movement amount belongs, to thereby specify that the collision form is a collision form corresponding to the region to which the point belongs; and
      set the activation condition in correspondence to the specified collision form.

2. An activation control device for at least one occupant protection device according to claim 1, further comprising a floor sensor fixed on a floor of a cabin of the vehicle and configured to detect a floor acceleration which is an acceleration in a vehicle front-rear direction,
   wherein the activation control unit is configured to:
      calculate an actual velocity decrease amount of the floor sensor based on the detected floor acceleration;
      determine that the activation condition is satisfied when the detected floor acceleration corresponding to the actual velocity decrease amount of the floor sensor is equal to or more than an activation threshold that changes in correspondence to the actual velocity decrease amount of the floor sensor; and
      store, in advance, a relationship between the velocity decrease amount of the floor sensor and the activation threshold for each collision form, and set the activation threshold based on the relationship corresponding to the specified collision form and the actual velocity decrease amount of the floor sensor, to thereby set the activation condition in correspondence to the specified collision form.

3. An activation control device for at least one occupant protection device according to claim 2, wherein:
the vehicle comprises a plurality of the occupant protection devices, and a plurality of the activation devices;
each of the plurality of the activation devices is configured to be capable of independently activating each of the plurality of the occupant protection devices; and
the activation control unit is configured to select an occupant protection device to be activated from among the plurality of the occupant protection devices in correspondence to the specified collision form.

4. An activation control device for at least one occupant protection device according to claim 1, wherein:
the front left sensor is configured to detect an acceleration in a direction which the front left sensor moves toward an inside of the vehicle as a positive acceleration;
the front right sensor is configured to detect an acceleration in a direction which the front right sensor moves toward an inside of the vehicle as a positive acceleration; and
the activation control unit is configured to:
define, in advance, in a coordinate system in which the first movement amount is set to a horizontal axis and the second movement amount is set to a vertical axis, a region including an origin of the coordinate system as a head-on collision region, which is a region corresponding to a head-on collision;
define, in advance, in the coordinate system, a region that includes a straight line on which both the first movement amount and the second movement amount are positive values and change while a one-to-one relationship is maintained, and does not include the head-on collision region, as a pole collision region, which is a region corresponding to a pole collision;
set the activation condition as a predetermined head-on collision activation condition when the point is in the head-on collision region; and
change the activation condition to a predetermined pole collision activation condition when the point is determined to have entered the pole collision region from the head-on collision region.

5. An activation control device for at least one occupant protection device according to claim 4, wherein:
the vehicle comprises a plurality of the occupant protection devices, and a plurality of the activation devices;
each of the plurality of the activation devices is configured to be capable of independently activating each of the plurality of the occupant protection devices; and
the activation control unit is configured to select an occupant protection device to be activated from among the plurality of the occupant protection devices in correspondence to the specified collision form.

6. An activation control device for at least one occupant protection device according to claim 1, wherein:
the vehicle comprises a plurality of the occupant protection devices, and a plurality of the activation devices;
each of the plurality of the activation devices is configured to be capable of independently activating each of the plurality of the occupant protection devices; and
the activation control unit is configured to select an occupant protection device to be activated from among the plurality of the occupant protection devices in correspondence to the specified collision form.

* * * * *